(12) United States Patent
Tidwell

(10) Patent No.: US 7,429,734 B1
(45) Date of Patent: Sep. 30, 2008

(54) SYSTEM AND METHOD FOR AIRCRAFT INFRARED COUNTERMEASURES TO MISSILES

(75) Inventor: Steven C. Tidwell, Kirkland, WA (US)

(73) Assignee: Aculight Corporation, Bothell, WA (US)

( * ) Notice: Subject to any disclaimer, the term of this patent is extended or adjusted under 35 U.S.C. 154(b) by 0 days.

(21) Appl. No.: 11/637,400

(22) Filed: Nov. 29, 2006

(51) Int. Cl.
*G01J 5/00* (2006.01)

(52) U.S. Cl. .................................. 250/338.1

(58) Field of Classification Search ... 250/338.1–338.5, 250/221, 203.1–203.7; 244/3.1, 3.11–3.19; 702/75, 76; 359/341.1
See application file for complete search history.

(56) References Cited

U.S. PATENT DOCUMENTS

| | | | |
|---|---|---|---|
| 0,000,169 | A | 4/1837 | Bigelow |
| 4,576,449 | A | 3/1986 | Ruger |
| 5,395,362 | A * | 3/1995 | Sacharoff et al. ........... 600/108 |
| 6,020,955 | A | 2/2000 | Messina |
| 6,288,381 | B1 | 9/2001 | Messina |
| 6,302,355 | B1 * | 10/2001 | Sallee et al. .............. 244/3.16 |
| 6,507,392 | B1 * | 1/2003 | Richards et al. .......... 356/141.5 |
| 6,813,296 | B2 | 11/2004 | Goyal et al. |
| 6,873,893 | B1 * | 3/2005 | Sanghera et al. ............. 701/49 |
| 6,878,923 | B2 | 4/2005 | Casteleiro |
| 6,879,447 | B2 | 4/2005 | Casteleiro |
| 7,304,296 | B2 * | 12/2007 | Mills et al. .................. 250/239 |
| 2002/0045811 | A1 * | 4/2002 | Kittrell et al. .............. 600/407 |
| 2003/0202168 | A1 * | 10/2003 | Berenz et al. ............. 356/4.01 |
| 2007/0008514 | A1 * | 1/2007 | Krasutsky .................. 356/4.01 |
| 2007/0075182 | A1 * | 4/2007 | Fetterly ..................... 244/3.16 |

OTHER PUBLICATIONS

Coherent, Inc., Analog BeamView Analyzer, www.coherent.com/Lasers/index.cfm?Fuseaction=show.print&ID=276, Dec. 24, 2007, pp. 1-7, Publisher: Internet Data Sheet.

Davidson N., et al., Fabrication of binary phase surface relief optical elements by selective deposition of dielectric layers, Review of Scientific Instruments, Feb. 1999, pp. 1264-1267, vol. 70, No. 2.

Dickey, Fred M., et al., Laser Beam Shaping Theory and Techniques, Laser Beam Shaping Theory and Techniques, 2000, pp. 21-25, Publisher: Marcel Dekker, Inc.

(Continued)

*Primary Examiner*—David P. Porta
*Assistant Examiner*—Kiho Kim
(74) *Attorney, Agent, or Firm*—Charles A. Lemaire; Lemaire Patent Law Firm, P.L.L.C.

(57) ABSTRACT

Apparatus and method for directing a laser beam at an object. Some embodiments include generating direction-control information, based on the direction-control information, directing laser energy into a first fiber at a first end of a first fiber bundle during a first time period, forming an output beam of the laser energy from the second end of the first fiber bundle, and steering the output beam of the laser energy from the first fiber in a first selected direction of a plurality of directions during the first time period, and optionally modulating an intensity of the laser energy according to a predetermined pattern. The direction-control information is based on sensing electromagnetic radiation from a scene. Some embodiments use a remote camera wire-connected to the image processor to obtain scene information, while other embodiments use a second fiber bundle to convey image information from an external remote lens to a local camera.

48 Claims, 14 Drawing Sheets

OTHER PUBLICATIONS

Friedman, Nir, et al., Acousto-optic scanning system with very fast nonlinear scans, Optics Letters, Dec. 15, 2000, pp. 1762-1764, vol. 25, No. 24.

Kaplan, Ariel, et al., Acousto-optic lens with very fast focus scanning, Optic Letters, Jul. 15, 2001, pp. 1078-1080, vol. 26, No. 14.

Mickelson, Alan Rolf, Guided Wave Optics, Section 5.5, Propagation in Fibers in General, Copyright 1993, pp. 172-194, Publisher: Van Nostrand Reinhold, New York.

Ongstad, A. P., et al., Performance Comparison of Optically Pumped Type-II Mid-Infrared Lasers, Aug. 23, 2005, pp. 1-7, vol. 98, No. 043108, Publisher: Journal of Applied Physics.

* cited by examiner

Conventional fiber bundle

Fused fiber bundle

SYSTEM AND METHOD FOR AIRCRAFT INFRARED COUNTERMEASURES TO MISSILES

STATEMENT OF GOVERNMENT INTEREST

This invention was made with Government support under contract number DAAB0701-D-G001 from the U.S. Army. The government has certain rights in this invention.

FIELD OF THE INVENTION

The present invention relates to laser-beam pointer devices, and more particularly to apparatus and method for infrared countermeasures (IRCM) to missiles launched against vehicles such as airborne helicopters, Navy vessels, and Army tanks by quickly determining a direction (e.g., toward an incoming missile) to which to point a modulated IR laser beam and for directing the laser beam in the determined direction.

BACKGROUND OF THE INVENTION

Advanced Man-Portable Air Defense Systems (MANPADS) present a significant threat to fixed-wing aircraft and helicopters. Mid-infrared laser-based infrared countermeasures (IRCM) systems could provide the needed protection from MANPADS for many types of aircraft. Unfortunately, with the complex pointer/tracker-turret assembly, these systems typically cost more than $1.5 million. This prohibitively high cost precludes use with large numbers of aircraft, leaving them unprotected from advanced MANPADS.

Laser beams can be pointed using a number of methods and mechanisms, some which allow aligning the laser beam with a sensor-determined direction, which is useful for IRCM. Among these are methods using turrets and/or one or more gimbaled mirrors, for example U.S. Pat. No. 6,020,955 "System for pseudo on-gimbal, automatic line-of-sight alignment and stabilization of off-gimbal electro-optical passive and active sensors" issued Feb. 1, 2000 to Peter Messina, and which is incorporated herein by reference. Messina describes an optical apparatus for use in auto-aligning line-of-sight optical paths of at least one sensor and a laser, comprising: at least one reference source for outputting at least one reference beam that is optically aligned with the line-of-sight of the at least one sensor, a laser reference source for outputting a laser reference beam that is optically aligned with the line-of-sight of the laser, a laser alignment mirror for adjusting the alignment of the line of sight of the laser beam, a sensor alignment mirror for adjusting the alignment of the at least one sensor, combining optics for coupling the plurality of reference beams along a common optical path, gimbal apparatus, a detector disposed on the gimbal apparatus for detecting the plurality of reference beams, a fine stabilization mirror disposed on the gimbal apparatus for adjusting the line of sight of the optical paths of the at least one sensor and the laser, and a processor coupled to the detector, the laser alignment mirror, the sensor alignment mirror, and the fine stabilization mirror for processing signals detected by the detector and outputting control signals to the respective mirrors to align the line-of-sight optical paths of the sensor and the laser. Other such systems or components are described in U.S. Pat. No. 6,288,381 issued Sep. 11, 2001 to Peter Messina titled "Integrated system for line-of-sight stabilization and auto-alignment of off-gimbal passive and active electro-optical sensors", U.S. Pat. No. 6,878,923 issued Apr. 12, 2005 to Carlos Casteleiro titled "Low profile optical imaging system having a wide field of regard", and U.S. Pat. No. 6,879,447 issued Apr. 12, 2005 to Carlos Casteleiro titled "Optical gimbal apparatus" which are all incorporated herein by reference. Such systems are complex and expensive.

U.S. Pat. No. 6,873,893 issued Mar. 29, 2005 to Sanghera et al. titled "Missile warning and protection system for aircraft platforms", and U.S. Pat. No. 6,813,296 issued Nov. 2, 2004 to Goyal et al. titled "GASB-clad mid-infrared semiconductor laser", which are incorporated herein by reference, describe other components that are used in some embodiments of the present invention.

There is a need for a low-cost laser pointer system that is much less complex than a conventional pointer/tracker-turret assembly.

BRIEF SUMMARY OF THE INVENTION

Novel technology of some embodiments of the present invention has been demonstrated in proof-of-concept breadboard experiments that, in some embodiments, offer protection from MANPADS via fiber-bundle-based low-cost laser pointing functions for 1/10th the cost of conventional turret or gimbal-based laser-pointer IRCM systems (such as those described in the above-cited patents), e.g., for any mobile platform (such as various aircraft such as low-thermal-signature rotary-wing Army platforms, nautical ships such as Navy destroyers, or land vehicles such as Army tanks or Humvees) or any fixed platform (such as a land-based communications center).

In some embodiments, the present invention provides a low-cost IRCM system that uses a distributed-aperture (i.e., a system with a plurality of remote lenses, each lens directing one or more beams from a plurality of optical fibers) beam-steering system, eliminating the mechanical two- or three-axis gimbaled pointer. The pointer/tracker assembly is also the least reliable component in conventional laser-pointer or other IRCM systems. Further, the low-cost method and apparatus of the present invention use the existing or Common Missile Warning Sensor (CMWS) or other conventional sensors for tracking what the laser beam should point at (e.g., incoming missiles), eliminating the costly fine-track infrared camera.

In some embodiments, the present invention provides an apparatus that includes a first fiber bundle having a plurality of light-transmitting fibers including a first fiber, a second fiber, and a third fiber, the first fiber bundle having a first end and a second end, a laser that emits laser energy, a processor that generates direction-control information, a fiber selector that is operatively coupled to the processor and based on the direction-control information, is configured to direct the laser energy into the first fiber at the first end of the first fiber bundle during a first time period, and transform optics located to receive the laser energy from the second end of the first fiber bundle and configured to form an output beam of the laser energy from the first fiber in a first selected direction of a plurality of directions during the first time period. Some embodiments further include a modulator that modulates an intensity of the laser energy according to a predetermined pattern. Some embodiments further include a sensor operatively coupled to receive electromagnetic radiation from a scene and to transmit sense information to the processor based on the received electromagnetic radiation, and wherein the processor is configured to generate the direction-control information based on the sense information. Some embodiments further include an ability to sense more than one object and simultaneously direct a plurality of laser beams in a plurality of different directions or sequentially direct a single laser beam in the plurality of different directions one at a time.

Another aspect of the invention, in some embodiments, is a method that includes providing a first fiber bundle having a plurality of light-transmitting fibers including a first fiber, a second fiber, and a third fiber, the first fiber bundle having a first end and a second end, generating direction-control information, based on the direction-control information, directing laser energy into the first fiber at the first end of the first fiber bundle during a first time period, forming an output beam of the laser energy from the second end of the first fiber bundle, and steering the output beam of the laser energy from the first fiber in a first selected direction of a plurality of directions during the first time period.

In other embodiments, the present invention provides an apparatus that includes a first fiber bundle having a plurality of light-transmitting fibers including a first fiber, a second fiber, and a third fiber, the first fiber bundle having a first end and a second end, means for generating direction-control information, means for directing laser energy, based on the direction-control information, into the first fiber at the first end of the first fiber bundle during a first time period, means for forming an output beam of the laser energy from the second end of the first fiber bundle, and means for steering the output beam of the laser energy from the first fiber in a first selected direction of a plurality of directions during the first time period.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
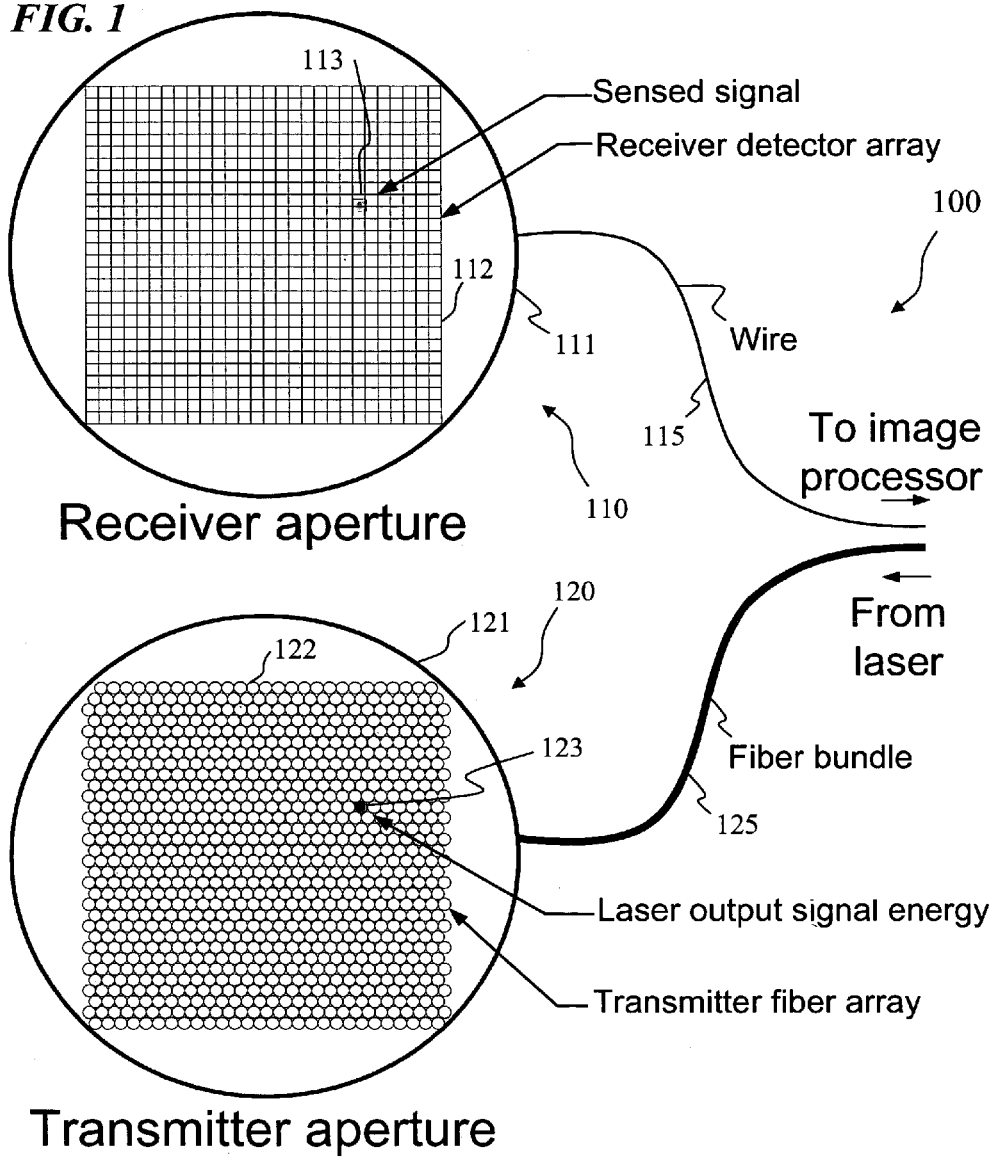
FIG. 1 is a diagram of a sensor/laser-pointer (e.g., IRCM) system 100 that illustrates a one-to-one correspondence between the receiver aperture and transmitting fiber according to some embodiments of the invention.

FIG. 1 is a diagram of a sensor/laser-pointer system 100 that illustrates a one-to-one correspondence between the receiver aperture and transmitting fiber according to some embodiments of the invention. Low-cost sensor/laser-pointer (e.g., in some embodiments, one useful for IRCM) system 100 of some embodiments of the present invention uses a distributed aperture to provide the beam steering typically conducted with a two- or three-axis precision gimbal. As shown in FIG. 1, the beam-steering system 121 of the present invention is the transmitter analog to a focal-plane missile-warning imager or sensor 111 (in some embodiments, imaging sensor 111 includes a camera and lens mounted on the outside of the platform, with a signal wire or cable running signals to a centrally located processor). In the sensor/laser-pointer system 100, the Missile Warning Sensor (MWS) sensor 110 includes a collection lens (not shown) that directs the ultraviolet (UV), visible or infrared (IR) light from an incoming missile or other object onto an array detector 112, where each resolution element (e.g., element 113) in the detector defines a solid angle in the MWS system's field-of-regard. The sensor signal is passed on wire 110 to an image processor 240 (see FIG. 2). The beam-steering output method and apparatus 120 of the present invention essentially uses the same concept in reverse. In some embodiments, using a multiple-element fiber bundle 122, laser power is directed into a particular fiber 123 (indexed to a pixel 113 on the sensor 110 (e.g., an MWS, in some embodiments), resulting in the laser energy being directed outward to the same solid angle as the radiation received from the threat or other object. In some embodiments, there is a one-to-one correspondence between resolution elements in the receiver array 111 and fibers in the transmitter array 121. Thus, in some embodiments, there is a one-to-one correspondence between each of a plurality of spots on the detector array 112 in the receiver aperture 111 and a corresponding one of a plurality of transmitting fibers in the array 122 making up the fiber bundle in the transmitting aperture 121.

In some embodiments, the one-to-one relationship is ensured by bundling and/or affixing to one another a plurality of fibers, and then cleaving the bundle, thus ensuring that each fiber end at one cleaved end corresponds exactly to that fiber at the other cleaved end. In some embodiments, a "folded" or "looped" (i.e., looped to some bend radius that will not break the fiber) middle point (i.e., somewhere between the two ends of the fiber, typically but not necessarily in the exact middle) of fiber is threaded from each external aperture on the vehicle (e.g., a helicopter) or other mobile or fixed platform, to the location of receiver 240/transmitter 220 (see FIG. 2), thus providing two fibers (a transmit fiber connected to a receive fiber at the loop or fold point) from each external aperture to receiver 240/transmitter 220. Once all the fibers are connected from their respective external apertures to their folded ends at the receiver/transmitter, the folded ends are bundled to, e.g., a square cross section, and cleaved to obtain a receive-end bundle and a transmit end bundle, each bundle having fiber ends in a mirror-corresponding configuration (i.e., once cut, the fibers across any given row that are left-to-right on the receiver will correspond to those fibers in a right-to-left order on the same row of the transmitter). In other embodiments, a large number of fibers can be wound (e.g., around a large circular form) to a length at least as long as the longest fiber routing in the vehicle (e.g., 2 meters, in some embodiments). Once all the fiber loops are wound, the fibers at one point along the circular form are gathered into a bundle (e.g., one having a square cross-section area), and are cleaved to obtain a receive end bundle and a transmit end bundle, each having fiber ends in a mirror-corresponding configuration (i.e., once cut, the fibers across any given row that are left-to-right on the receiver will correspond to those fibers in a right-to-left order on the same row of the transmitter). At some midpoint between the transmit end and the receive end, each fiber is separately routed to its respective external aperture on the vehicle and cleaved at that point to form one fiber that goes to the receive end bundle, and another fiber that goes to a mirror-corresponding point on the transmit end bundle.

Fiber bundles are commonly used in medical endoscopes, where in some embodiments 30,000 fibers are bundled to create a flexible imaging cable. Recent developments (e.g., at the Naval Research Laboratory) have developed low-loss mid-infrared-transmitting fibers, (e.g., chalcogenide-glass fibers), and commercial manufacturers have fabricated mid-IR fibers into multi-element bundles.

In some embodiments of this design, the receiver and transmitter apertures are co-located and coupled rigidly to a common structure. Thus, any flexing in the platform structure will not lead to misalignment between the receiver and the transmitter.

Figure 2:
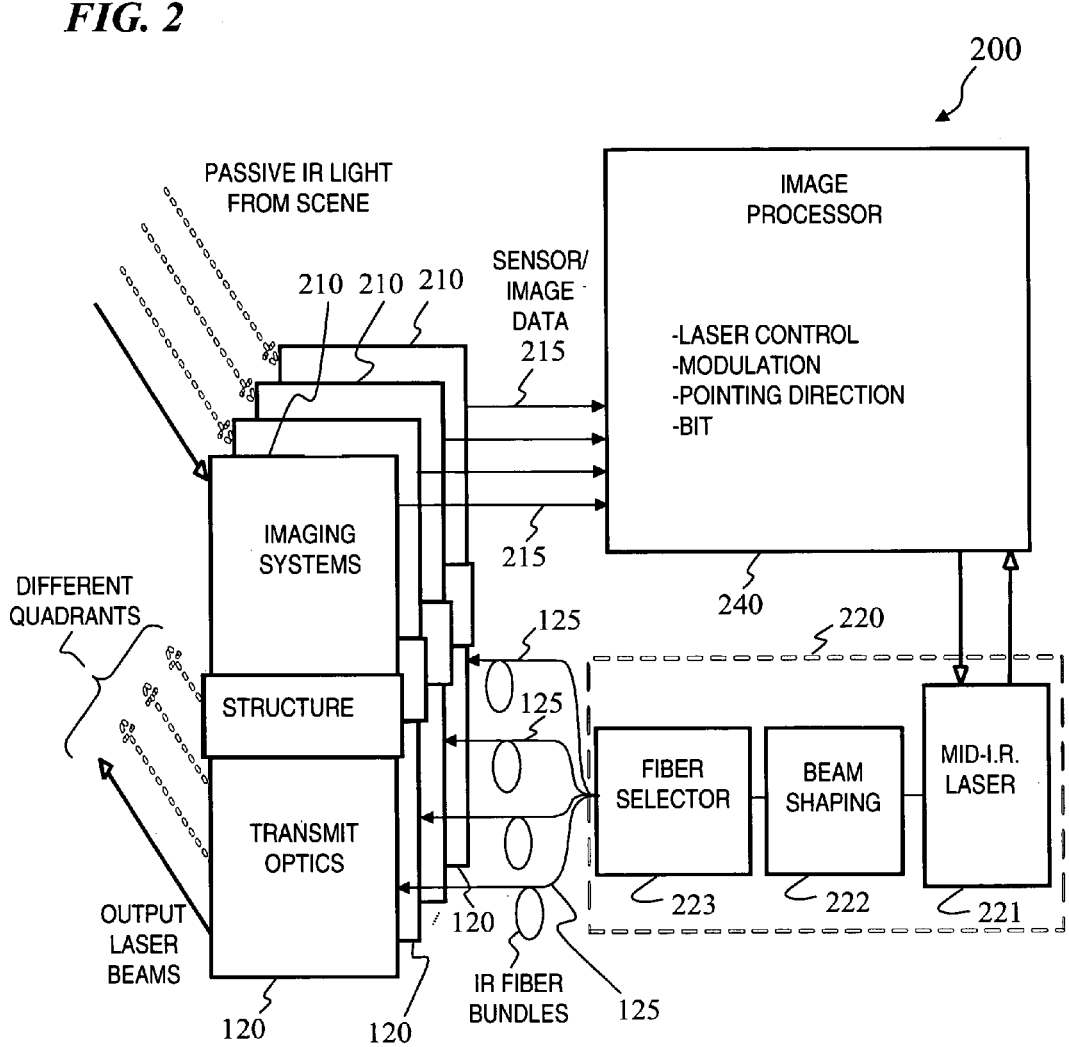
FIG. 2 is a system block diagram for a low-cost sensor/laser-pointer system 200.

FIG. 2 is a system block diagram for a low-cost sensor/laser-pointer system 200. In some embodiments, a fiber bundle and transmit lens (or other transform optics configured to transform light from a spatial location at the end of the fiber bundle into a beam at a selected direction, i.e., azimuth angle and altitude angle) is matched to each MWS sensor, and, in some embodiments, a plurality (e.g., four) sensors are typically used to cover a helicopter or other mobile platform (in some embodiments, the present invention is particularly useful for a platform with a low heat signature). A single centrally mounted laser in the helicopter (or other platform) can address all MWS sensed locations by coupling the laser beam into a specific fiber element in a bifurcated bundle. In some embodiments, a conventional scanning galvanometer is used to steer the laser beam into the various fibers of the transmit bundle. This small-field-of-view with precision motion is ideal for the galvanometers, which, in some embodiments, can cost less than $6,000. Further cost reduction is achieved by using only the coarse threat-location data directly from the MWS sensor and eliminating the fine-track mid-infrared camera. Elimination of the gimbal pointer and tracking camera can provide $500,000-$800,000 cost saving per transmitter assembly.

FIG. 1 shows there is a one-to-one correspondence between a resolvable spot on the detector array in the receiver aperture and a transmitting fiber in the array making up the fiber bundle in the receiver aperture.

FIG. 2 shows a distributed-aperture laser-pointer system 200 (in some embodiments, one that is used for IRCM) that uses coarse-tracking data from the image sensors (e.g., MWS) to establish threat coordinates and a single scanner (or other form of fiber selector) to point the output laser beam (e.g., a jamming beam, in some embodiments) in the required direction. Significant cost reductions can result from eliminating multiple beam pointers and fine-track cameras. In some embodiments, system 200 includes a plurality of image-sensor systems 210, each pointing in a different direction to obtain image data 215 from various parts of the environment, which is sent to and processed by image processor 240. In some embodiments, image processor 240 also generates laser control (to power the lasers), modulation control (to modulate the laser beam, if desired, either by modulating power to the lasers or by modulating the beam from the lasers (e.g., using an acousto-optic modulator (AOM)), and direction control (to point the laser beam in the direction of a sensed object), wherein these controls are sent as signals to laser-pointer unit 220. In some embodiments, laser-pointer unit 220 includes at least one mid-IR laser 221, beam-shaping optics 222 (in some embodiments, beam-shaping optics 222 is merged with one or more of the X-Y deflection mirrors of fiber selector 223). The laser beam is directed into the end of one of the fibers in one of the one or more fiber bundles 125, wherein each fiber bundle 125 is routed along or through the platform to a corresponding transmit optics 120, wherein the far ends of the fibers and the transmit optics are configured to form one or more output laser beam(s) in various directions (e.g., some embodiments use four bundles 125, four transmit optics units 120 to direct the laser beam(s) to one or four quadrants).

Although, in some embodiments, the laser would be capable of producing output with very narrow solid angles, the divergence of the laser must be increased to fill the solid angle typical of the MWS imaging sensor, to ensure that the target identified within an imaging-sensor pixel or cell (e.g., an MWS cell) is illuminated. Because of the increased laser divergence, the power of the laser must be increased, to provide a sufficient jamming/laser-signal strength (J/S) ratio. For certain platforms such as low-signature helicopters, this approach is feasible due to the relatively low radiant intensity needed to provide sufficient laser-signal strength (J/S ratio) to cause the missile to optical break-lock or other desired effect on the target object. Beam shaping is used in some embodiments to propagate a flat-top intensity profile, which improves the efficiency and maintains the laser-power requirement at a manageable level.

Figure 3:
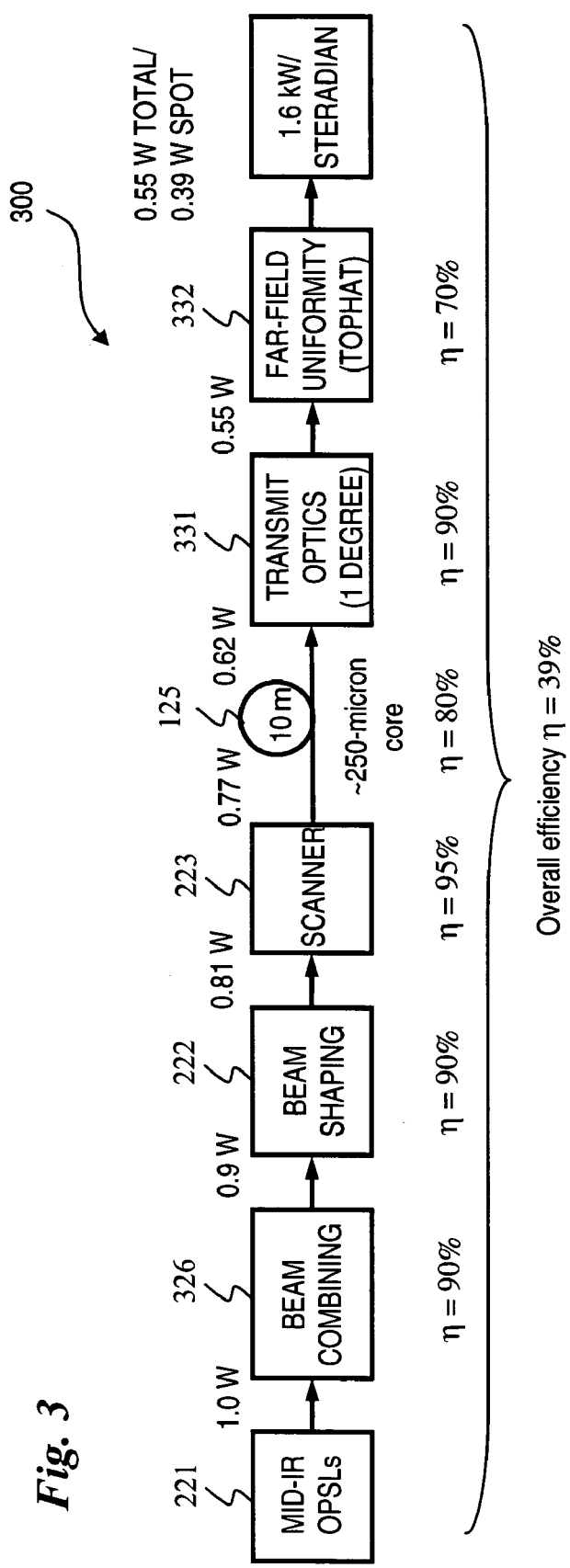
FIG. 3 is a block diagram of signal losses for one embodiment of a laser-pointer system 300.

FIG. 3 is a block diagram of efficiencies (losses) that illustrates laser-power scaling, accounting for the various loss elements in the optical train in one embodiment. For example, choosing a one-watt laser and a beam divergence of one degree, the scaling shows that a far-field output radiant intensity of 1.67 kW/steradian per W of input power is produced, in some embodiments. Any arbitrary laser power could be used in various embodiments. In some embodiments, one or more mid-IR optically pumped semiconductor lasers (OPSL) 221 output a given power (e.g., 1 watt) into beam-combining unit 326 having an efficiency of 90 percent, thus transferring about 0.9 W to beam-shaping unit 222 also having an efficiency of 90 percent, thus transferring about 0.81 W to scanning unit 223, which has an efficiency of 95 percent. About 0.77 W of laser power are transferred one fiber (e.g., a 10-meter fiber having a 250-micron-diameter core) within fiber bundle 125, the fiber having an efficiency of 80 percent, thus transferring about 0.62 W to transmit optics 331 (e.g., optics that forms an output beam of suitable divergence (e.g., one degree, in some embodiments) to achieve the desired fill factor. If the transmit optics 331 have an efficiency of 90 percent, they transfer about 0.55 W to the output beam (e.g., a beam having a fairly uniform "top-hat" power-distribution shape in the far field), of which about 0.39 W is within the area of regard. The fiber losses, even in the mid-IR wavelengths, are very low since large-core fibers are used and the losses due to far-field uniformity are low since a uniform profile is generated in the far field. Researchers at the Air Force Research Lab (AFRL) have demonstrated laser power greater than 10 W with an optically pumped semiconductor laser (OPSL), which could be used in some embodiments (see, e.g., A. P. Ongstad et al., "Performance comparison of optically pumped type-II midinfrared lasers," J. Appl. Phys. 98, 043108 ($15^{th}$ Aug. 2005) (7 pages), which compared the performance of three optically pumped, type-II quantum well lasers with differing quantum well (QW) confinement. One of the active regions emphasized hole confinement, another emphasized electron confinement, while the third incorporated both electron and hole confinements. In all cases the wells were inserted in a thick $In_xGa_{1-x}As_ySb_{1-y}$ waveguide/absorber region. The lasing wavelengths at 84 degrees K were 2.26, 3.44, and 2.37 microns, respectively. The maximum peak output powers and differential quantum efficiencies η at 84 K were similar for the hole-well and W lasers (about 13 W, η≈0.55), but significantly reduced in the electron-well-only laser (2.3 W, η=0.14).).

FIG. 3 shows that the distributed-aperture laser-pointer concept (in some embodiments, one useful for IRCM) with a laser power of 1 W and one degree beam divergence (the moon is about one-half degree in width, so this 1-watt laser-input embodiment projects about 0.39 watts into a far-field spot about twice the moon's diameter) will achieve a radiant intensity of 1.67 kW/steradian in the far field. In some embodiments, other laser input powers scale proportionately, so a laser is selected having the power needed to obtain a desired radiant intensity. Fiber-coupling losses are very low since some embodiments use a large-core fiber, and losses due to the far-field uniformity are low since some embodiments generate a uniform profile in the far field.

Figure 4:
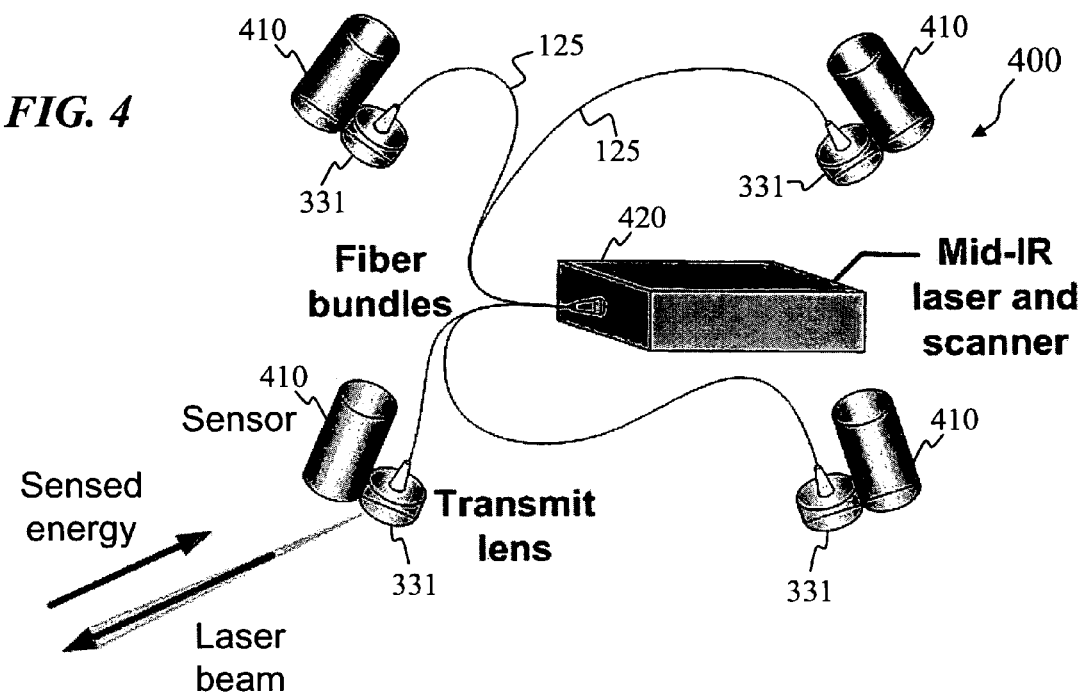
FIG. 4 shows one overall system concept for a low-cost distributed-aperture beam-steering laser-pointer system 400.

In some embodiments, the invention could enable the hardware cost of an IRCM system for low-signature helicopters to be reduced to $\frac{1}{10}^{th}$ the cost of current IRCM systems. FIG. 4 shows the overall system concept for a low-cost distributed-aperture beam-steering laser-pointer (IRCM) beam-steering system 400. The invention could enable the hardware cost of a laser-pointer system for certain platforms (e.g., for low-signature helicopters) to be reduced to about ten percent of the cost of current laser-pointer systems. In some embodiments, a plurality (e.g., four, in some embodiments) of sensors 410 (e.g., solid-state cameras or other suitable imager for one or more wavelengths of interest) each points in a different direction from the platform (e.g., an aircraft) and provide direction parameters to laser/scanner unit 420 that outputs a laser beam to one or more fibers of a plurality of fiber bundles (e.g., four, in some embodiments), wherein one or more fibers outputs its light through each transmit lens 331 (in some embodiments, each transmit fiber's far end has its own lens to point its beam in a particular chosen direction with a chosen beam divergence). In some embodiments, system 400 includes a plurality of image sensors 410 (e.g., cameras having a suitable wavelength sensitivity, speed and field-of-view) and a corresponding number of transmit lenses 331 each coupled to a respective fiber bundle 125. In some embodiments, signals are coupled from the image sensors 410 to mid-IR-laser/scanner system 420, which then generates and modulates a laser signal and directs the laser signal to a selected one of the fibers in fiber bundles 125 in order that an output beam is projected from its transmit lens 331 to the desired direction (e.g., a selected azimuth and altitude corresponding to the sensed energy (which could be UV, visible, and/or IR)).

Figure 5:
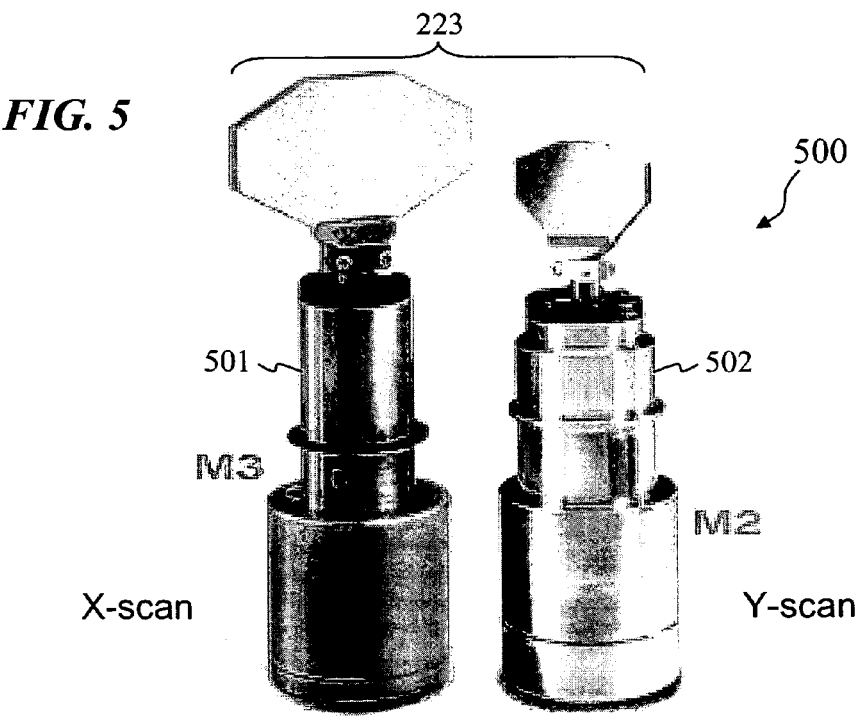
FIG. 5 shows a pair 500 of galvo scanners.

FIG. 5 shows a pair 500 of galvo scanners that are used in some embodiments to direct the output laser beam using mirrors for fiber selector 223 (in an X-direction using mirror M3 on one scanner 501 and in a Y-direction by mirror M2 on the other scanner 502) into the end of a selected fiber in a fiber bundle (e.g., bundle 122 of FIG. 1). In some embodiments, M-series galvo scanners from GSI Lumonics Inc. are used (e.g., see www.gsig.com/scanners/optical_spec.html or contact GSI Group, 39 Manning Rd., Billerica, Mass. 01821). In some embodiments, the mirror on one or more of the scanners also provides a focussing function for the outgoing laser beam.

Another potential system cost saving can be obtained from fiber coupling the mid-IR laser to the pointer/tracker of a conventional laser-pointer-tracker system. Fiber coupling allows the Mid-IR laser to be isolated from the helicopter platform's vibration, thereby reducing the engineering required to harden the laser. Isolating the laser from vibration should also reduce the lifecycle costs by improving the reliability. The most significant cost savings, however, is present where multiple pointer trackers were required to provide adequate protection, with a single remotely located laser being coupled into any pointer tracker. Using a single laser for all bundles precludes or complicates the option of pointing laser beams at multiple objects (countering multiple threats) simultaneously, and in some embodiments, this level of complexity can add cost to the system. In some embodiments, multiple threats or other objects are addressed serially (pointed to in a sequential manner), using a single laser. In other embodiments, multiple lasers are provided in order to simultaneously address multiple threats or other objects.

Figure 6:
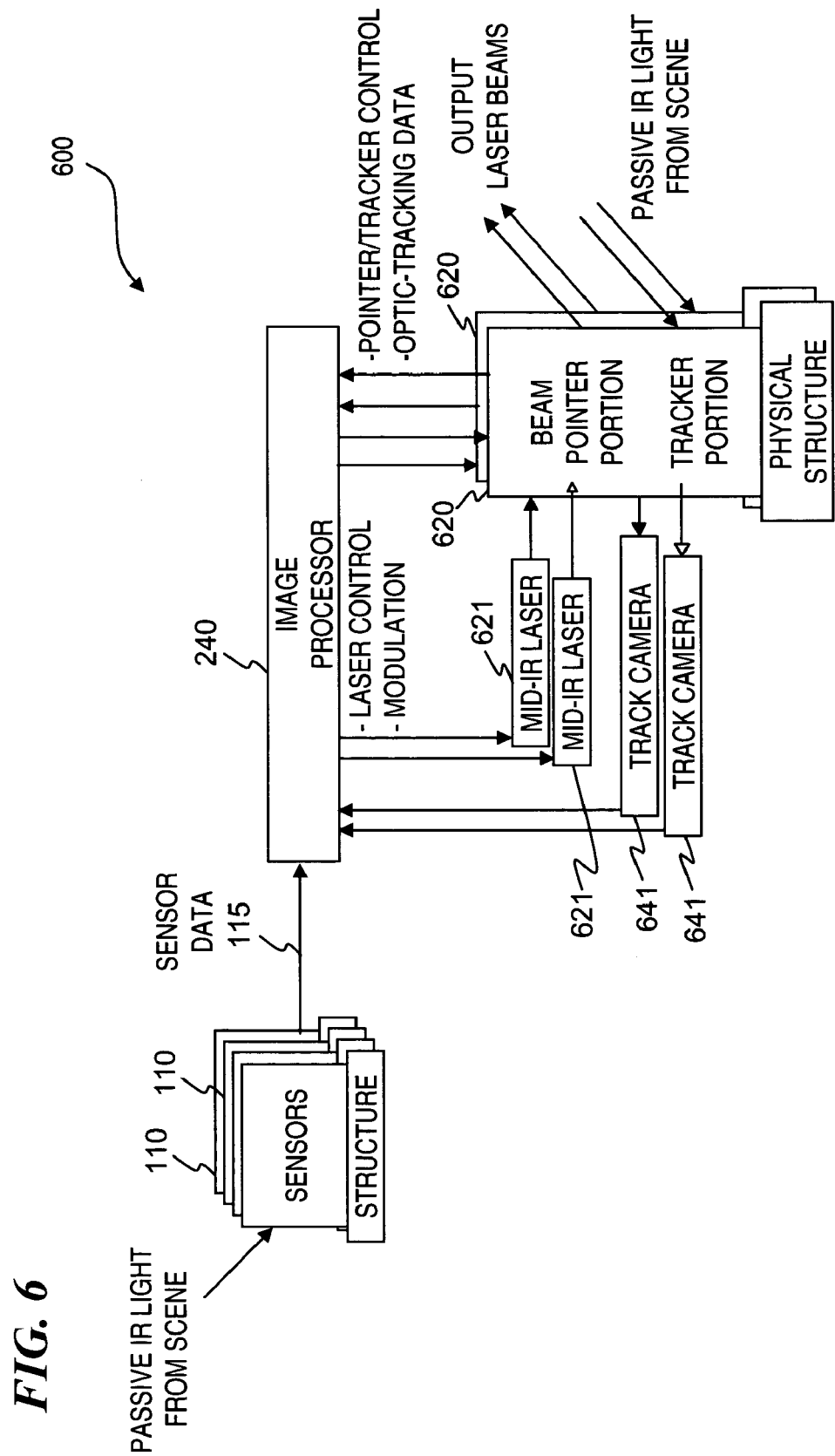
FIG. 6 shows a conventional system 600 that is improved using portions of the teaching of the present invention.

FIG. 6 shows a conventional system 600 that is improved using portions of the teaching of the present invention. In some embodiments, system 600 includes a plurality of image sensors 110 attached to one or more structures of the platform, which passively (i.e., without transmitting any illumination) detect IR light from a scene, and transmit sensor-data signals 115 to image processor 240. Based on sensing an object of interest, processor 240 generated laser-power-control and modulation-control signals to mid-IR laser unit(s) 621 which direct laser energy to the beam-pointer portion of pointer/tracker unit(s) 620, which then direct that laser energy into one or more output laser beams. In some embodiments, passive IR light from the scene is gathered by tracker portion(s) of pointer/tracker unit(s) 620 into tracking cameras 641, which provide fine-tracking data to image processor 240, in order that it continues to provide pointer-control signals to pointer/tracker unit(s) 620 to keep the output laser beams on the desired object.

Figure 7:
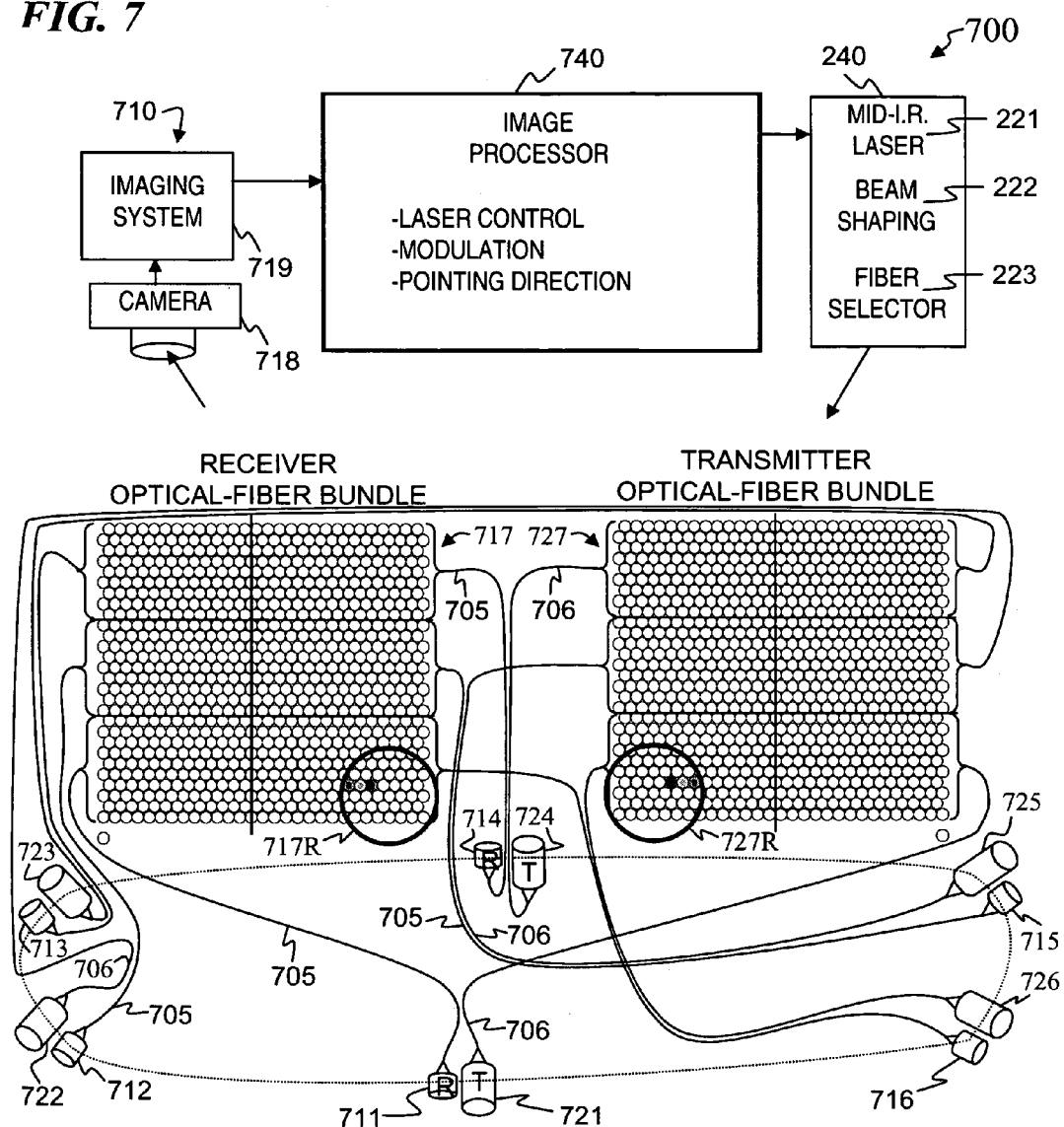
FIG. 7 is a block diagram of a low-cost sensor/laser-pointer system 700.

FIG. 7 is a block diagram of a low-cost sensor/laser-pointer system 700. In some embodiments, system 700 includes a plurality of fiber bundles 705 for receiving scene light from respective receiving optics units (e.g., unit 711 pointing downward relative to the platform, unit 712 pointing behind, unit 713 pointing left, unit 714 pointing upward, unit 715 pointing ahead, and unit 716 pointing right) and a plurality of fiber bundles 706 for transmitting laser light through respective transmitting optics units (e.g., unit 721 pointing downward relative to the platform, unit 722 pointing behind, unit 723 pointing left, unit 724 pointing upward, unit 725 pointing ahead, and unit 726 pointing right). In some embodiments, the ends of all of the receiving fiber bundles 705 are imaged using a single camera 718 connected to imaging system 719 of imaging unit 710, which provides image data to image processor 740, which then generates laser power control, modulation control, and pointing-direction control to transmitting unit 720, which, in some embodiments, has a laser 221, beam shaping 222, and steering 223 (see unit 220 of FIG. 2), and outputs its laser energy to the end of one of the fibers in fiber bundles 706. In some embodiments, if a plurality of target objects are simultaneously identified by imaging unit 710, these objects are sequentially pointed at by the output laser beam.

Figure 8:
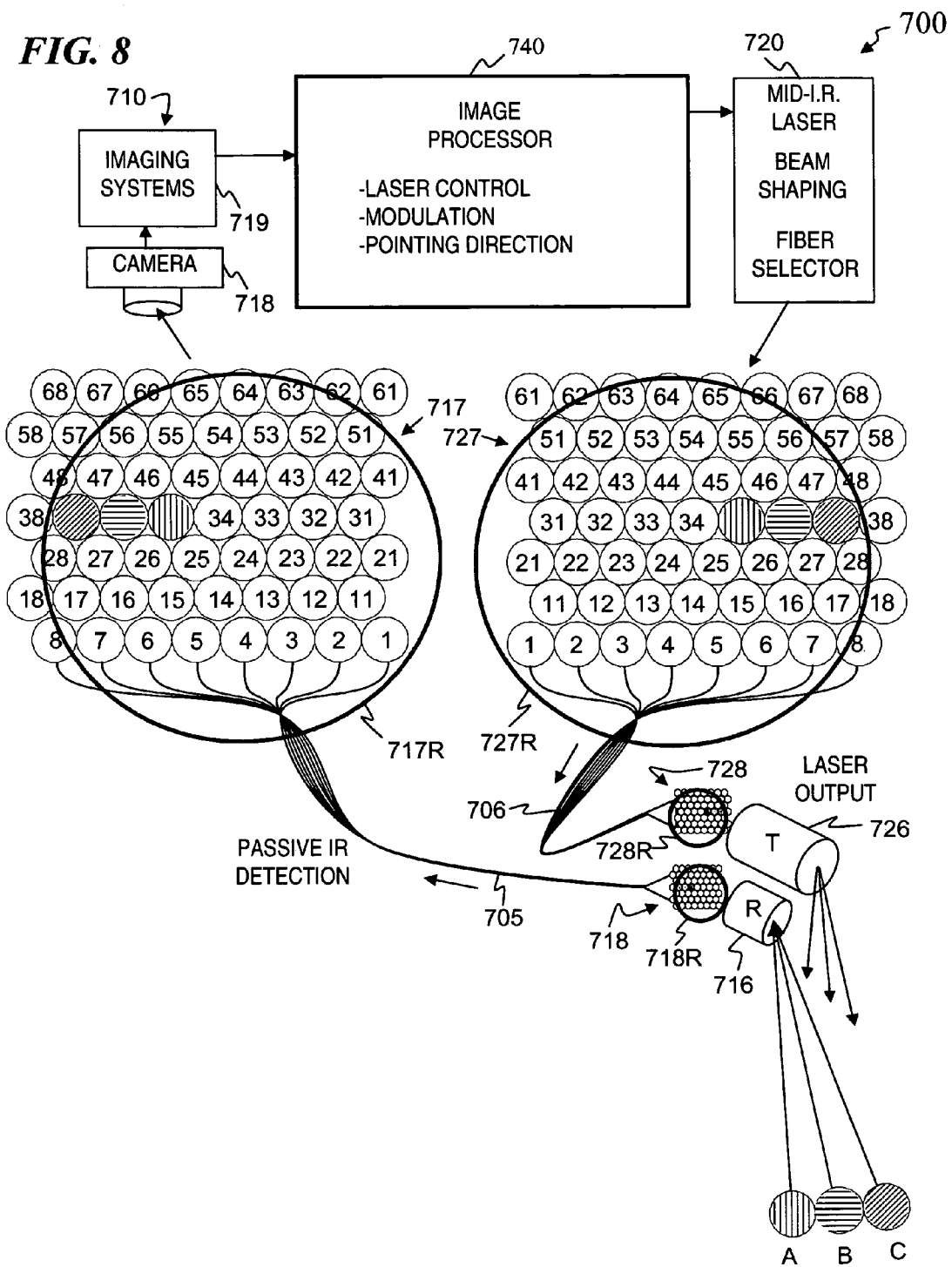
FIG. 8 is a partially enlarged block diagram of low-cost sensor/laser-pointer system 700.

FIG. 8 is a partially enlarged block diagram of low-cost sensor/laser-pointer system 700 that was shown in FIG. 7. A close-up view of the interior or central ends of a subset 727R of the transmit fibers 727 (here, numbered 1 to 61, where fibers 35, 36, and 37 are shaded with vertical, horizontal, and diagonal lines, respectively), and a smaller view of the exterior or far ends of subset 728R are shown next to right-hand transmit lens 726. Similarly, a close-up view of the interior or central ends of a subset 717R of the receive fibers 717 (here, numbered 1 to 61 and a mirror image of the transmit fibers 727R, where fibers 35, 36, and 37 are shaded with vertical, horizontal, and diagonal lines, respectively), and a smaller view of the exterior or far ends are shown next to right-hand transmit lens 726. Suppose a moving object is successively seen at points A, B, and C at the bottom of the diagram, and is imaged to the ends of three receive fibers by lens system 716, which light is carried by the fibers to the interior ends 717R of fibers 35, 36, and 37 (shaded with vertical, horizontal, and diagonal lines, respectively, these fiber ends are between fiber end 34 and fiber end 38) and imaged by imaging unit 710 and processed by processor 740. Processor 740 controls the laser output to be sent first to the end of vertical-line-shaded fiber 35, then to the end of horizontal-line-shaded fiber 36, and then to the end of diagonal-line-shaded fiber 37, and these transmit fibers carry the laser output to transmit lens 726 which transforms the light at a spatial location on the end of the fiber bundle to an angular direction and forms an output laser beam that essentially tracks the object as it moves from A to B to C. In some embodiments, processor 740 determines the direction and rate of movement of the object, and thus at least partially anticipates where the object will be in order to move the output laser beam more quickly to the appropriate fiber and better track the object with the laser beam.

Figure 9:
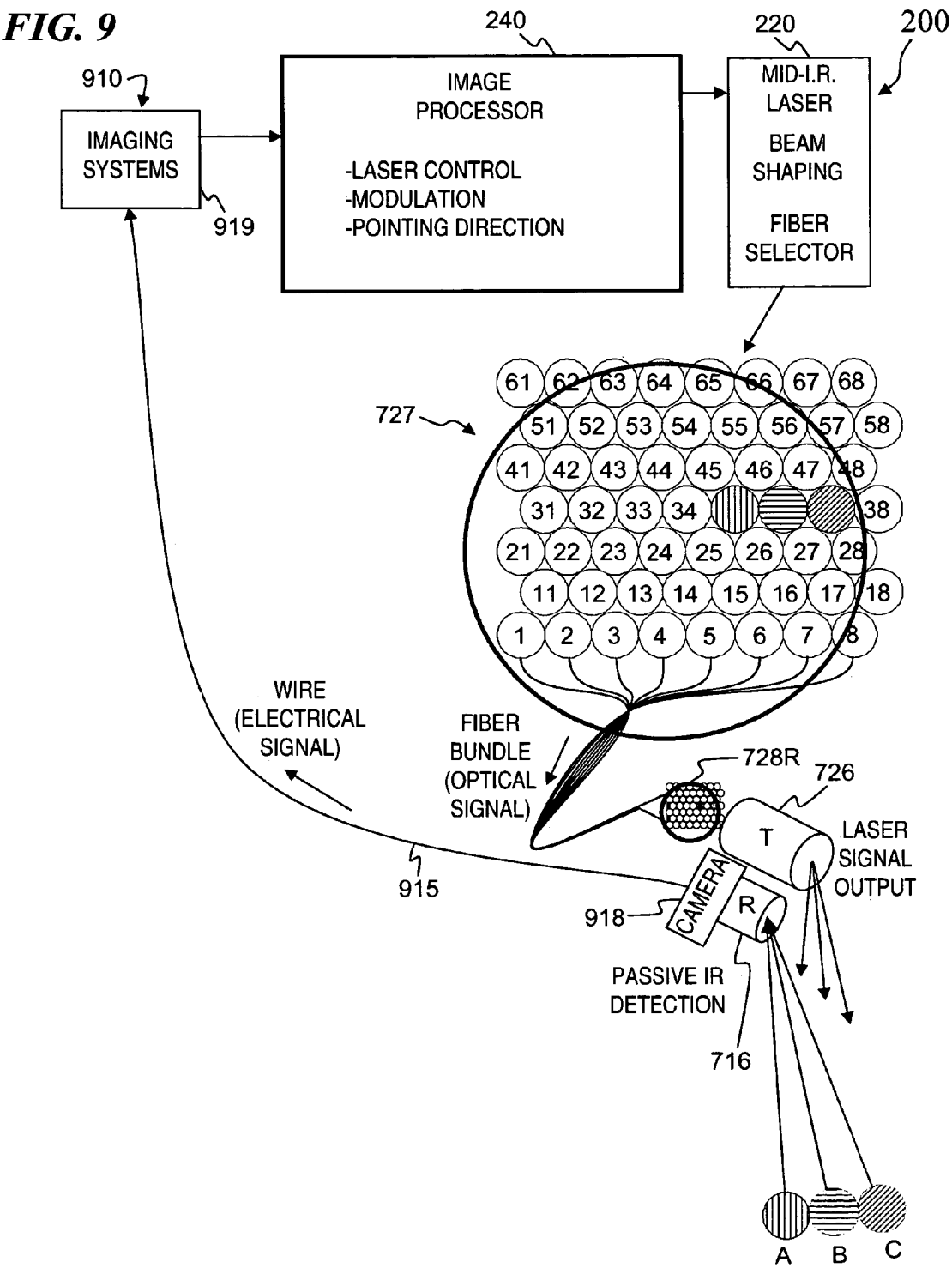
FIG. 9 is a partially enlarged block diagram of low-cost sensor/laser-pointer system 200.

FIG. 9 is a partially enlarged block diagram of alternative low-cost sensor/laser-pointer system 200. System 200 is similar to system 700 on the transmit side, but rather than a centrally located camera and a fiber bundle bringing the image to a central location on a fiber bundle, the camera 918 is remotely located (e.g., having its lens on or near the exterior of the platform next to transmit lens 726), with an electrical wire (or a single optic fiber) 915 carrying image data (rather than the image itself, as with a fiber bundle) to the imaging unit 919. Other aspects of system 900 are as described for FIG. 7 and/or FIG. 2.

Figure 10:
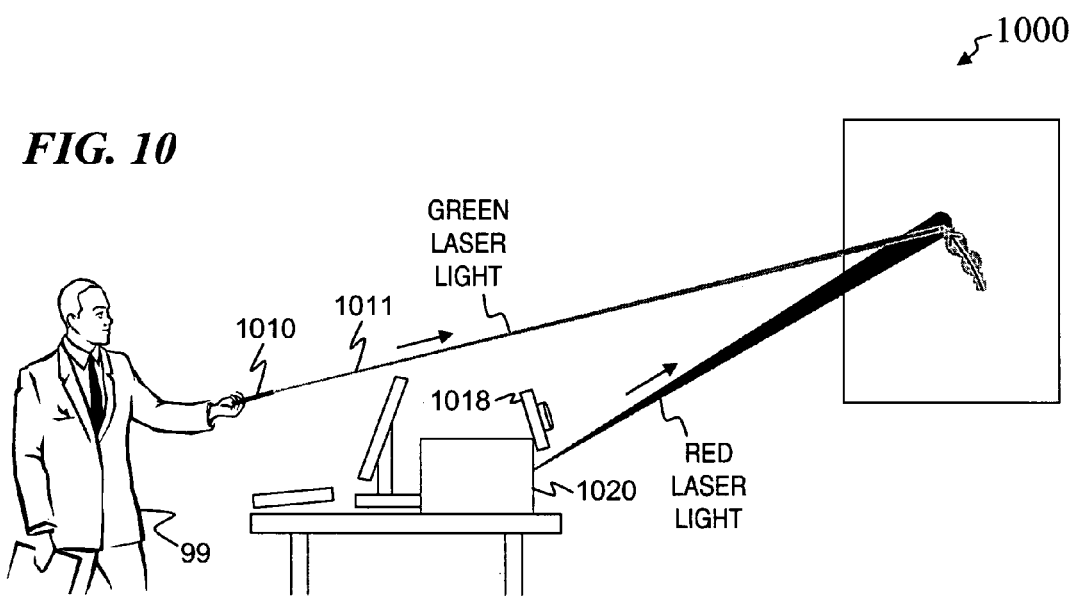
FIG. 10 is a perspective diagram of a proof-of-concept sensor/laser-pointer system 1000.

FIG. 10 is a perspective diagram of a proof-of-concept sensor/laser-pointer system 1000. In some embodiments, a person (user 99) points a hand-held laser 1010 that outputs a green laser beam 1011 onto a screen. A camera attached to processor 1040 locates the green spot on the screen and controls a red laser beam output to track and follow the green spot. In some embodiments, green and red are chosen to make more apparent the functioning of the system. In some embodiments, user 99 uses a plurality of green lasers to simulate a plurality of objects to sense, analyze and track. In some embodiments, this system is used in development and testing of the algorithms and hardware configuration of the system, since the visible light laser spots make it easier to debug the system than using infrared objects and tracking beams.

Figure 11:
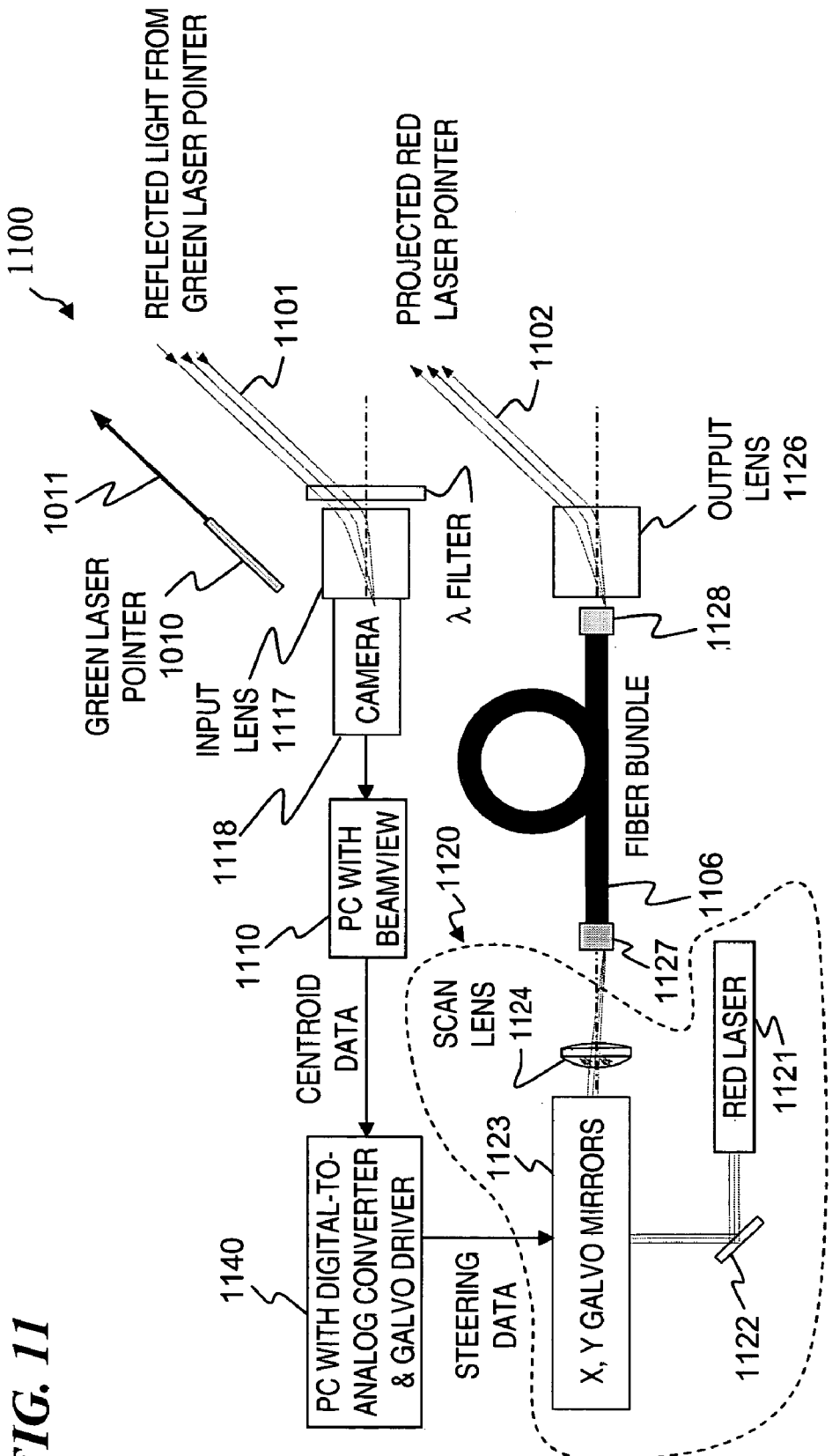
FIG. 11 is a block diagram of a proof-of-concept sensor/laser-pointer system 1100.

FIG. 11 is a block diagram of a proof-of-concept sensor/laser-pointer system 1100 (e.g., one implementation of system 1000 for some embodiments). In some embodiments, system 1100 includes a wavelength filter 1116 for receiving scene light and passing the green but not the red portions, a receiving lens 1117 and camera 1118 that passes an image signal to imaging unit 1110 (e.g., a personal computer with BeamView (from Coherent Inc., 5100 Patrick Henry Drive, Santa Clara, Calif. 95054, or other suitable hardware/software), which provides image data to image processor 1140, which then generates pointing-direction control to transmitting unit 1120, which, in some embodiments, has a laser 1121, beam shaping 1122, and steering 1123 (similar to unit 220 of FIG. 2), and outputs its laser energy to the near end 1127 of one of the fibers in fiber bundle 1106. The remote end 1128 of the fiber bundle 1106 projects its light through output/transmitting lens 1126 into a beam 1102 that points in the direction of the spot reflected into received light 1101. In some embodiments, if a plurality of target objects are simultaneously identified by imaging unit 1110, these objects are sequentially pointed at by the output laser beam.

Figure 12:
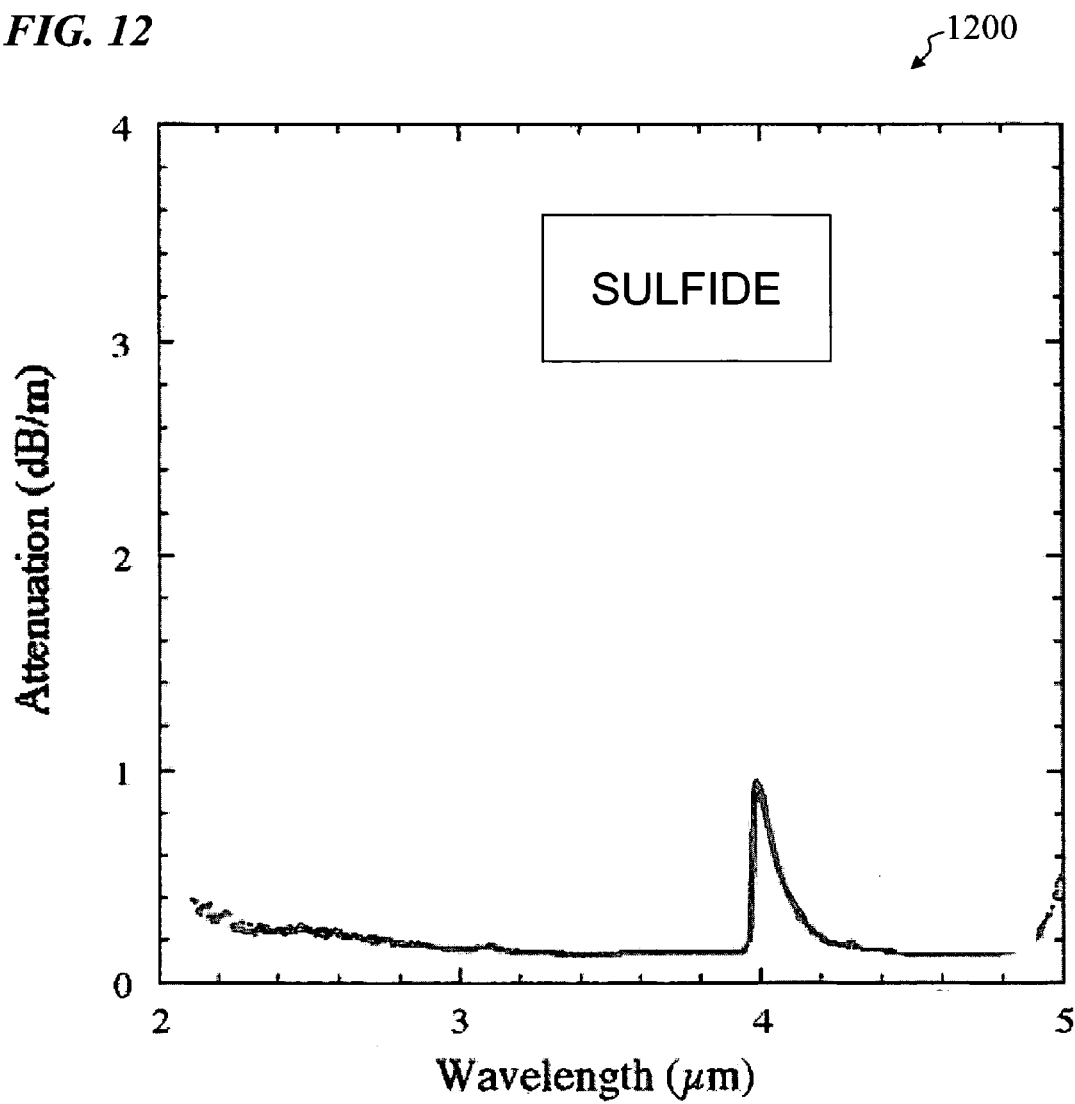
FIG. 12 is a graph 1200 of attenuation versus wavelength for one type of optical fiber.

FIG. 12 is a graph 1200 of attenuation versus wavelength for one type of optical fiber. FIG. 12 shows that certain chalcogenide-glass fibers transmit have low loss over a large portion of the mid-IR wavelength range from 2.2 μm to 4.9 μ/m, with the exception of a single absorption feature between 3.95 and 4.2 μm.

Figure 13:
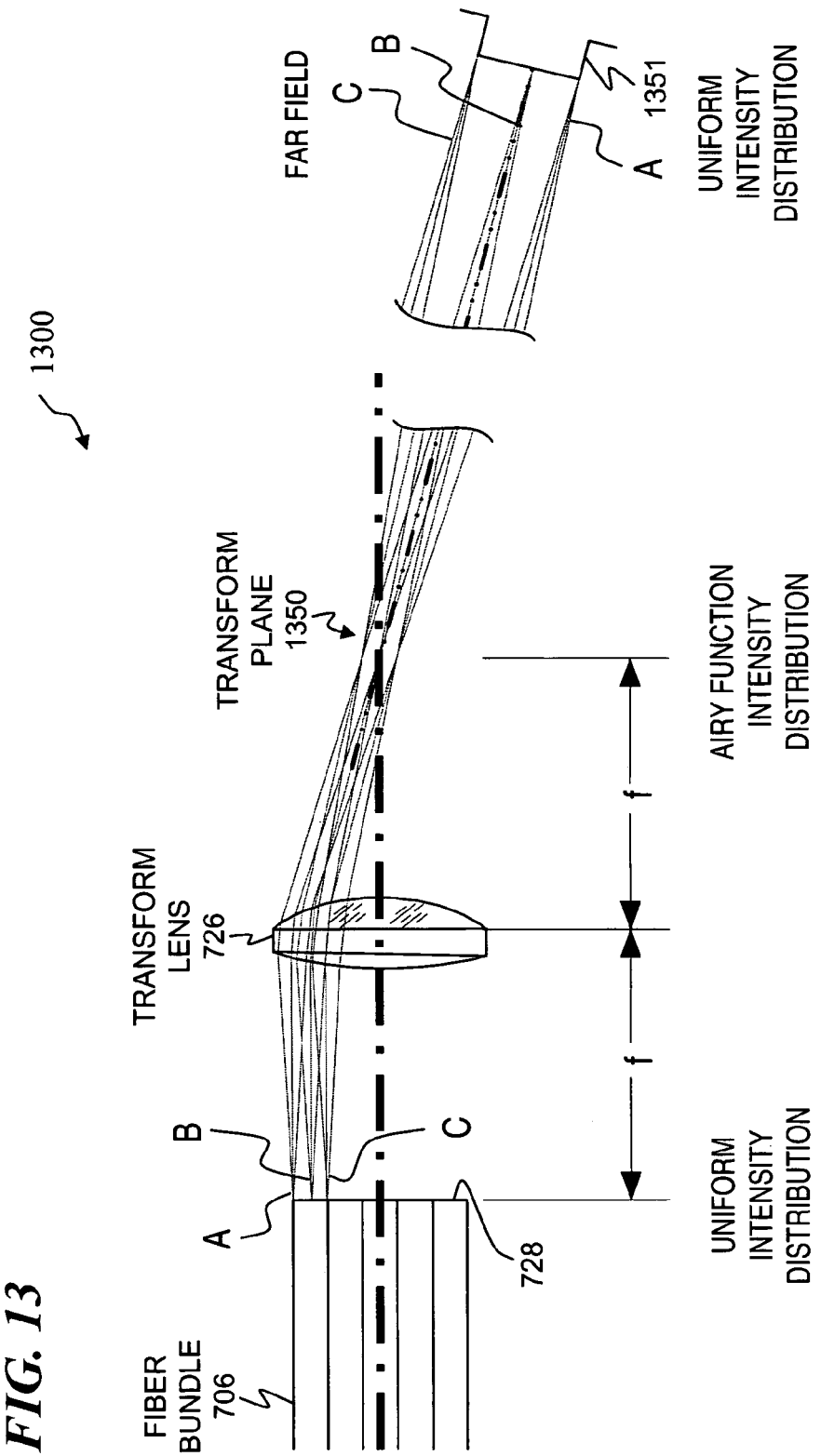
FIG. 13 is a block diagram of an output aperture 1300 and a laser-beam path from a fiber bundle.

FIG. 13 is a block diagram of an output aperture 1300 and a laser-beam path from a fiber bundle end 728 of a fiber bundle 706. In some embodiments, multimode fibers are used in order to obtain a uniform intensity distribution over most of each fiber end (e.g., from top (A), middle (B) and bottom (C)). This light passes through transform lens 726, and generates an Airy function intensity distribution 1350 at a transform plane (at a front focal distance f from the lens) and forms a substantially uniform top-hat intensity distribution 1351 in the far field.

Figure 14:
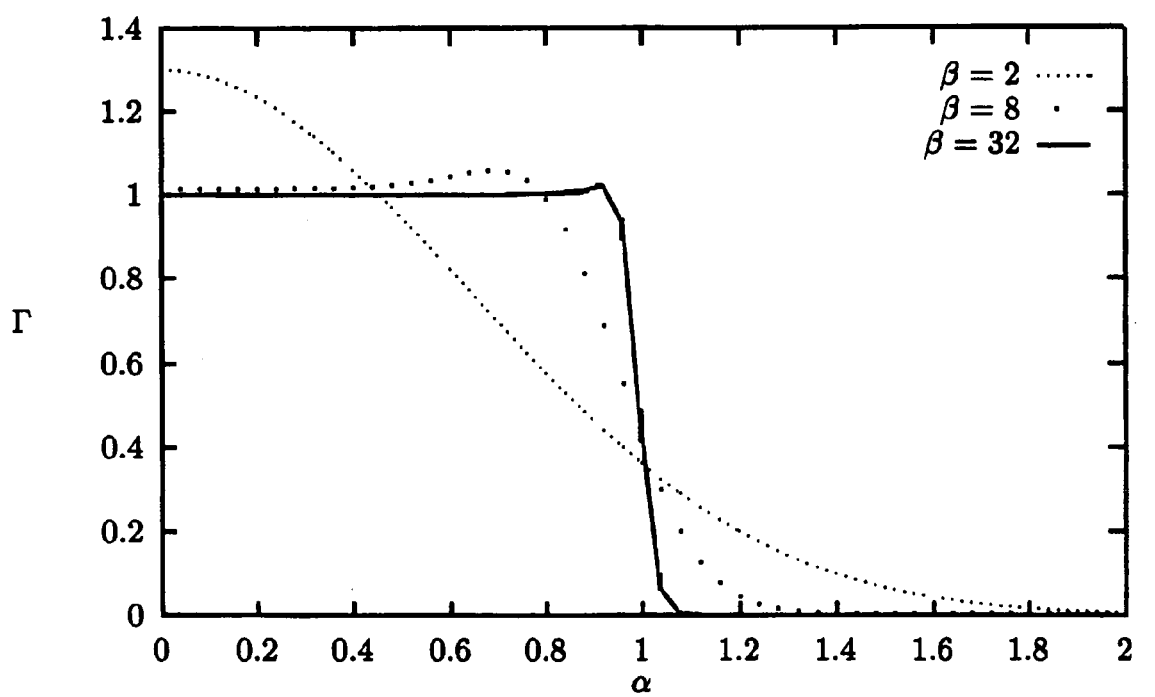
FIG. 14 is a graph 1400 of attenuation versus wavelength for one type of optical fiber.

FIG. 14 is a graph 1400 that shows the effect of increasing the parameter β (discussed more below) on the shape of the output-intensity profile (Γ is normalized intensity and α is normalized radius). It can be seen that with β>32 the output-beam-intensity profile is essentially a flat top. This puts a lower limit on the fiber-core diameter of $D_f$>85 microns. If $D_f$=100 μm is chosen then the configuration parameter is V=18.8 and the number of modes the fiber can carry is M=178.

Figure 15:
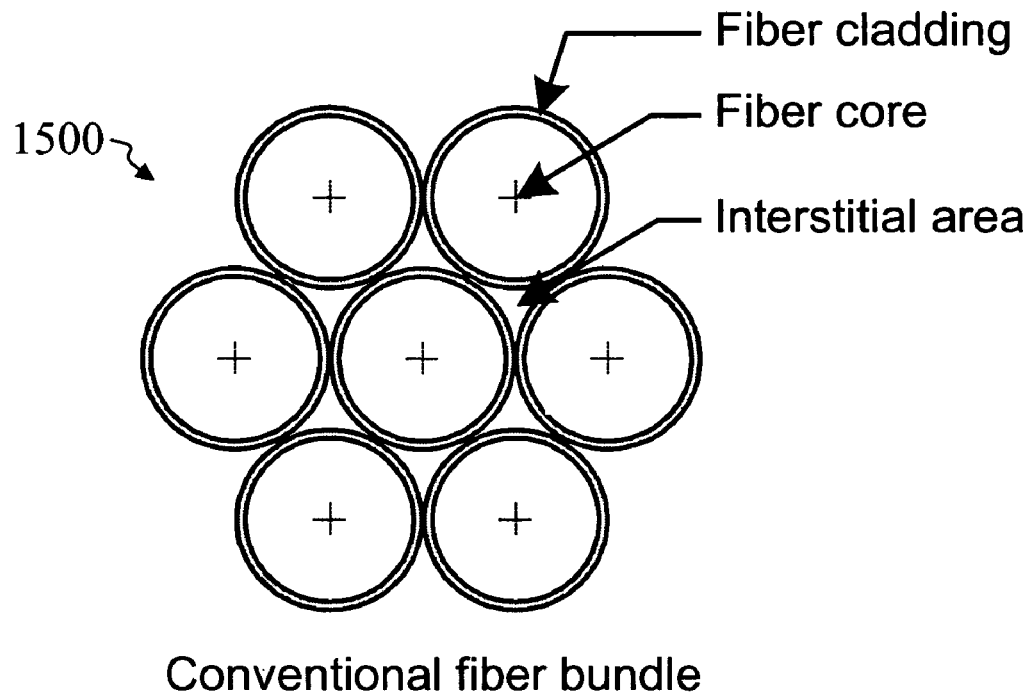
FIG. 15 is an end view of a portion of a conventional fiber bundle 1500 that is used in some embodiments.

FIG. 15 is an end view of a portion of a conventional fiber bundle 1500 that is used in some embodiments. In some embodiments, when cylindrical fiber ends are tightly bundled, they form a hexagonal pattern with open interstitial space between each triplet of fibers. Note that in some embodiments, very large cores and very thin cladding is used in order to direct as much laser light into the fiber as possible. The round shape, even for multimode fibers, does not promote uniform intensity distribution as well as the configuration of FIG. 16.

Figure 16:
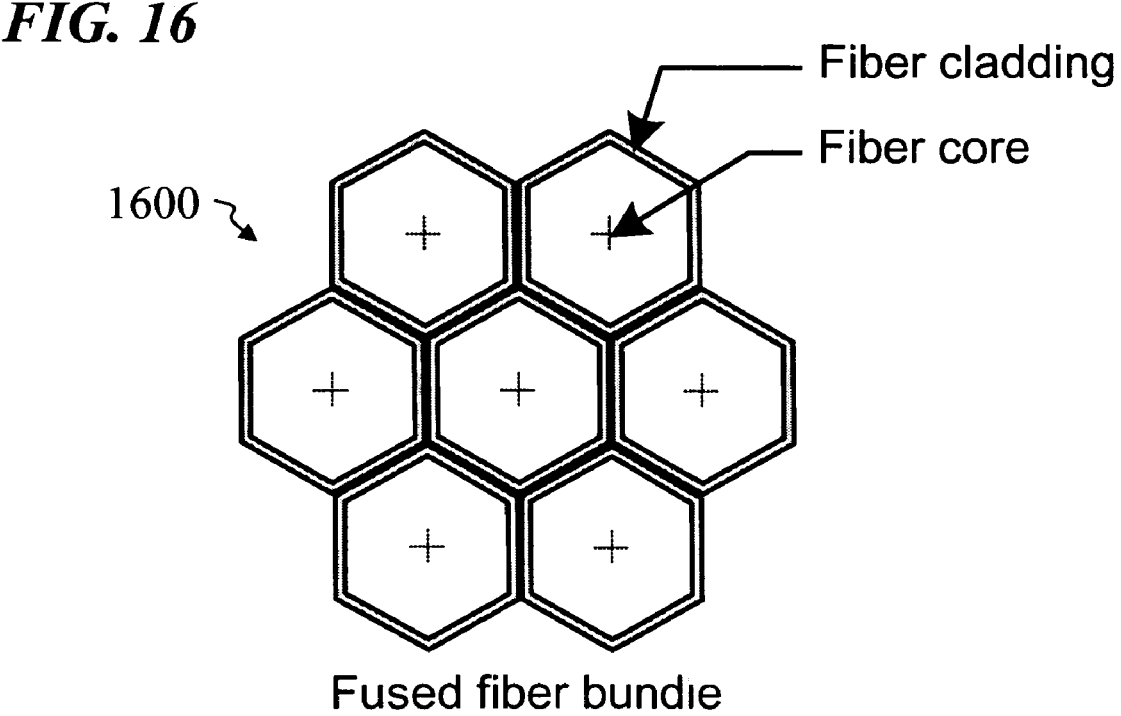
FIG. 16 is an end view of a portion of a fused fiber bundle 1600 that is used in some embodiments.

FIG. 16 is an end view of a portion of a fused fiber bundle 1600 that is used in some embodiments. In this configuration, the fibers are fused such that each fiber forms a hexagonal shape that is tightly packed against its neighbors. This increases the amount of laser light transferred into the fibers (since little is lost in interstitial spaces), as well as providing additional reflection surfaces to make the intensity distribution more even.

System-Design Considerations

The most significant losses are in the fiber coupling and the far-field profile. The OPSL output is diffraction limited (DL) in one direction and 4 to 5 times DL (four to five times diffraction limited) in the orthogonal direction. In order to produce the required output divergence in the far field, assuming a 12.4-mm output aperture, some embodiments are limited to a beam quality of two to three times DL. Thus, there is a power loss in one dimension when coupling into the fiber. The loss due to the far-field profile is a result of the non-uniform far-field profile. If a Gaussian distribution is produced in the far field with a $1/e^2$ diameter of 2 mrad, then the intensity at the edge of the field is only 23% that of a uniform distribution of the same size. Nonetheless, even with these inefficiencies the laser power required to produce a radiant intensity of 1.67 kW/steradian is less than 1 W.

Alternative-System Concept

FIG. 6 shows a laser-pointer system 600 of some conventional embodiments. Multiple pointer trackers will probably be required to achieve adequate protection, given the large field-of-regard. System 600 includes a plurality of image sensors 110 that provide image data to image processor 240, which in turn provides pointing parameters to beam pointers of pointer/tracker units 620 that point laser beams coupled from lasers 621 onto one or more remote objects. Tracking cameras 641 track the objects providing feedback to the pointers to keep them pointing in the desired direction(s). In a modification of conventional system 600, the system cost could be reduced by fiber coupling the laser to multiple pointer trackers, thereby reducing the number of lasers required. Similarly, one alternative embodiment of the present invention (depicted in FIG. 7) eliminates one or more of the multiple pointer trackers by fiber coupling the light from a single scanner to multiple locations on the helicopter platform. Further cost reductions are obtained in some embodiments by eliminating the fine-track cameras and relying on the coarse-track data from the missile-warning or other image sensors to establish the threat's or other object's coordinates. The laser-beam divergence and power can be increased to match the precision of the coarse-track data to assure the laser signal (e.g., jamming signal) intercepts the object (e.g., incoming missile or other threat target). The schematic for such a system is shown in FIG. 7.

The key to understanding this concept is that there is a one-to-one correspondence between resolution elements in the receiver and fibers in the transmitter, as illustrated in FIG. 8. FIG. 8 shows a one-to-one correspondence between a resolvable spot on the detector array in the receiver aperture and a transmitting fiber in the array making up the fiber bundle in the transmitter aperture. Each resolution element in the detector defines a solid angle in the MWS field-of-regard. If a threat is detected within that resolution element the laser power is directed into a particular fiber that transmits into that same solid angle. One key aspect of this design is that the receiver and transmitter apertures are co-located and coupled rigidly to a common structure. Thus, any flexing in the platform structure will not lead to misalignment between the receiver and transmitter.

In some embodiments, the divergence of the laser is increased to fill a solid angle equivalent to one pixel of the MWS. The power of the laser must be increased, as well, to provide a sufficient jam signal. Fortunately, because the beam can be many times diffraction limited and still fall within this solid angle, a more uniform profile can be transmitted into the far field. FIG. 3 shows that a 1-W laser generates a far-field radiant intensity of 1.67 kW/steradian if a one-degree beam divergence is chosen. Researchers at AFRL (e.g., see the A. P. Ongstad et al. article cited herein) have demonstrated output powers of 14 W at 3.5 microns from an OPSL, which would correspond to 11 W at 4.5 microns. Fiber-coupling losses are assumed to be very small since in some embodiments the beam is coupled into a fiber having a large-mode-area core (e.g., one having a core of about 250 microns diameter, in some embodiments) fiber.

The top-hat profile is created in the far field by generating a uniform intensity at the end of the fiber and then imaging the end of the fiber bundle into the far field. The key is in producing a uniform intensity over the end of a fiber in a way that is not affected by varying the fiber-bundle handling or environment. Nominally, the OPSL output will not fill all of the fiber modes, and the fiber will probably not be long enough to allow sufficient mode mixing. Applying mechanical stress or shaping the fiber (non-circular cross section), perhaps over a subsection, will alter the mode-coupling properties and can be used to vary the output profile. Shaping the injected beam (changing the intensity or phase profile) such that it fills all of the fiber modes can also be used to improve the output uniformity. However, since the coupling between modes is determined largely by the defects in the fiber, and mid-IR fiber was developed only recently, the best method for generating a uniform intensity will have to be determined empirically.

Fiber-Bundle Demonstration Experiment

The fiber-bundle experiment shown in FIG. 10 and FIG. 11 sends out a red laser output beam that is pointed to track or follow a green spot projected from a green laser pointer onto a wall or screen. In some embodiments, the red track beam steps from one location to the next (due to the spacing, beam divergence, and pointing direction of the various fibers) as the beam is switched from one fiber to the next in response to the continuous motion of the green-laser-pointer spot. Using visible wavelengths eases issues with diagnostics and makes the operation of the system even more visible (apparent to observers). The field-of-regard in the experiment, in some embodiments, is 30 degrees horizontal and vertical. The 1-degree divergence of the track beam would be maintained as is present in some embodiments of the invention. Thus, the fiber bundle would contain about nine hundred fibers in a nested square array. In other embodiments, other widths of field of regard, other solid-angle divergences for the individual beams, and other numbers of fibers can be used to suit the requirements of a particular installation.

The block diagram of a system 1100 for the experiment is shown in FIG. 11. The upper half of the system provides a lab version of an imaging sensor 710 and the image processor 740. The lower half of FIG. 11 provides the track laser, the mirrors and lenses for injecting the beam into the fiber bundle, the fiber bundle itself, and the output lens.

Mid-IR Fiber-Bundle Design

Various embodiments of the invention use various wavelengths for the lasers. In some embodiments, mid-IR wavelengths (e.g., between about 2 microns and about 5 microns) are used. In some embodiments, the distributed-aperture approach of the present invention for a low-cost pointer tracker has a mid-IR fiber bundle that serves to distribute the laser energy to transmit apertures co-located with the imaging sensors. The design of the fiber bundle can have a significant impact on the efficiency of the system as a result of fiber-coupling losses because the fiber bundle affects the far-field intensity distribution. The efficiency with which laser light is coupled to the target determines the size, weight, and cost of the laser, so it is important to consider the fiber-bundle design tradeoffs carefully.

In this section the objectives of the fiber-bundle design for some embodiments are laid out and the design considerations are described that result in the choice of important design parameters. Methods are also described for generating uniform spatial intensity at the end of the fiber and coupling the laser light into and out of the fiber bundle.

Design Objectives

The design parameters for some embodiments of the fiber bundle with typical values for some embodiments are listed in Table 2. These values are not derived from a specific set of requirements; rather they are an estimate of what is required from the distributed-aperture system to be an effective laser-pointer system for some applications.

TABLE 2

Example parameters for the fiber bundle, in some embodiments:

| Design Parameter | Value |
|---|---|
| Divergence of laser output | 1° FW |
| Uniform far-field beam distribution | $I = I_{mean} +/- 10\%$ within 1° cone |
| Power within the output divergence cone | >70% |
| Match the receiver field-of-regard (FOR) | 90° cone |
| Minimize low-intensity areas in the FOR | $I < 90\%$ of $I_{mean}$ in <15% of FOR |
| Limit coupling and absorption losses | <20% |

Fiber-Bundle Design

The characteristics of the light exiting the bundle are determined both by the parameters of the individual fibers and those of the fiber bundle. The properties of the fibers used in some embodiments are given in Table 3, and the wavelength-transmission range is shown in FIG. 12.

TABLE 3

In some embodiments, the fiber bundle is based on the properties of low-loss chalcogenide glass fibers, as follows:

| Parameter | Value |
|---|---|
| Attenuation: | <0.2 db/m |
| Diameter ($D_f$): | Free design parameter (Core diameters ranging from 50 μm to 500 μm are used in various embodiments, however smaller-core or larger-core fibers are used in other embodiments.) |
| Cladding thickness: | Free design parameter (Attenuation will increase with thinner cladding.) |
| Numerical aperture (NA): | 0.20 |
| Length: | <5 m |
| Damage limit: | 1.1 GW/cm² |

Achieving Uniform Intensity at the Fiber End

To obtain a uniform or top-hat profile in the far field requires beginning with a fiber that has a uniform intensity profile over the core, and transforming that into an Airy-pattern intensity distribution in the near field, as illustrated in FIG. 13 and FIG. 14. Propagation to the far field transforms the beam back into a uniform intensity profile.

To produce a uniform intensity distribution at the output of the fiber requires that the fiber core is large enough to support a large number of transverse modes. The number of modes that a cylindrical fiber can support is given by $$M \equiv \frac{V^2}{2}$$

where V is a configuration parameter given by $$V = \frac{\pi \times D_f NA}{\lambda}.$$

In some embodiments, it is also important to keep the diameter of the fiber as small as possible so that the bundle dimensions do not get too large. It can be shown (Dickey and Holswade, *Laser Beam Shaping Theory and Techniques*, Marcel Dekker, Inc., p 23 (2000)) that the difficulty of redistributing the energy in a laser beam can be estimated by the dimensionless parameter $\beta$ where $$\beta = \frac{2\pi D_i D_o}{\lambda z}$$

where $D_i$ and $D_o$ are the input and output beam diameters respectively. Substituting in the parameters for one embodiment of the invention gives $$\beta = \frac{2\pi D_f NA}{\lambda}$$

If $\beta$ is large the problem follows geometrical theory of beam shaping. If $\beta$ is small then the problem is dominated by diffraction making it impossible to redistribute the laser power. FIG. 14 shows the effect of increasing the parameter $\beta$ on the shape of the output-intensity profile ($\Gamma$ is normalized intensity and $\alpha$ is normalized radius). It can be seen that with $\beta > 32$ the output-beam-intensity profile is essentially a flat top. This puts a lower limit on the fiber-core diameter of $D_f > 85$ microns. If $D_f = 100$ μm is chosen then the configuration parameter is V=18.8 and the number of modes the fiber can carry is M=178.

Coupling the Laser into the Fiber

The next question is how the laser light may be injected in such a way that it occupies the modes. The most straightforward method is to simply couple the light into the fiber and let coupling between fiber modes transfer light from the initially occupied modes to all of the modes. Unfortunately, this method requires long fibers (>100 m) and the absorption and scattering losses that would result from propagating over larger distances in the fiber cannot be tolerated.

Another method of filling the fiber modes is to degrade the beam-parameter product of the laser light upon injecting it into the fiber such that it fills the fiber beam-parameter product. The beam-parameter product of a mid-IR fiber with a 100-μm core is 40 mm-mrad. Optically pumped semiconductor lasers (OPSLs) typically have beam-parameter products of about 25 mm by 10 mm-mrad in the directions parallel and perpendicular to the emitting junction. Thus, the beam-parameter product must be degraded by about 1.6 times in one direction and by four times in the other. Focusing the laser to a spot size slightly smaller than the fiber core and using an appropriate binary phase plate (see N. Davidson, R. Ozeri, and R. Baron, "Fabrication of binary phase surface relief optical elements by selective deposition of dielectric layers", Rev. Sci. Instru., 70, 2, pp. 1245-1247 (1999)) to expand the divergence on the beam such that it matches the fiber numerical aperture (NA) will degrade the beam-parameter product. The phase plate reduces the spatial coherence of the laser light. For example, in some embodiments, 10-W laser would lead to a peak intensity of <0.5 MW/cm² on the fiber end, well below the 1.1 GW/cm² damage limit.

It is reasonable to wonder if speckle due to the interference between modes could result in a non-uniform intensity distribution at the end of the fiber. If the bandwidth of the laser light satisfies the following relationship $$\Delta\lambda > \frac{\lambda NA^2}{n^2 V}$$

the device of the present invention is in the mode-continuum limit where the speckle size approaches zero and the modal noise is not an important effect. (See, e.g., Mickelson, Alan *Guided Wave Optics*, Van Nostrand Reinhold, p 189 (1993).) Assuming a core index of 2.4 gives a lower limit for the bandwidth of 1.5 nm. The bandwidths of OPSLs are on the order of 50 nm, so modal noise will not degrade the far-field uniformity with these sources; however, a solid-state mid-IR laser would probably have speckle problems.

Bundle Configuration

To cover the field-of-regard of the missile-warning sensor the fiber bundle must be composed of a 90×90 matrix of fibers, since each fiber will have a 1° field of view and the sensor has a 90° field-of-regard. With 8,100 fibers that have 100-μm cores the fiber bundle will have a cross section of >1 cm². The efficiency due to the fill factor is the fraction of the bundle area made up of the fiber cores. This efficiency determines the coverage in the far field, although there will be some overlap between the fiber images due to the smoothing effects of turbulence and defocus. In a conventional hexagonal packing pattern $\eta_{ff}$ is given by $$\eta_{ff} = \frac{\pi}{2\sqrt{3}}\left(\frac{D_f}{D_c}\right)^2$$

where $D_f$ is the core diameter and $D_c$ is the fiber diameter with the cladding. The first term is due to interstitial areas between fibers ($\pi/2\sqrt{3}=0.907$) and the second term is due to the finite thickness of the cladding. As shown in FIG. 15, the fibers can be arranged in a conventional hexagonal pattern or fused (as shown in FIG. 16) to eliminate the interstitial area. (In some embodiments, the bundle fill factor can be increased by about 10% if the ends are fused to eliminate the interstitial areas.) Another advantage of hexagonal fibers is that the shape results in the injected light being thoroughly mixed so the fiber modes are filled and the output is spatially uniform. The corners in the fused fiber bundle may result in additional losses in the far field due to diffraction losses. Also, fusing can lead to breakage in silica fibers, so it must be determined if sulfide fibers can be fused without damaging the fibers.

The cladding thickness affects both the fiber bundle fill factor and the losses due to light leakage out of the fiber. If a fiber for long-distance light transport were being designed, the cladding thickness would be made at least 5 times greater than the longest wavelength the fiber would carry to limit losses. As the cladding thickness is decreased the rays striking the cladding at high angles of incidence will leak out through the cladding and be lost. Light in the higher-order modes tends to propagate at higher angles, so the higher modes will be the first to be lost. Fortunately, many embodiments of the invention use fiber lengths less than five meters (5 m) so light leakage losses should not be too high. Some embodiments select the cladding thickness of 10 μm initially based primarily on the fill-factor issue.

Design-Parameter Summary

The various parameters of the fiber and bundle design have been analyzed in light of a baseline set of requirements and assigned reasonable values. With the values selected it appears that it will be possible to produce a flat-top distribution in the far field, cover the entire missile-warning sensor field-of-regard, meet efficiency goals, and cover the field-of-regard while minimizing areas with low radiant intensity due to cladding and interstitial areas Table 4 summarizes the design parameters for the fiber bundle and describes the effects of scaling the parameter to guide future design tradeoffs.

TABLE 4

Summary of fiber bundle design parameters and the implication of varying the values.

| Parameter | Value | Scaling |
|---|---|---|
| Fiber-core diameter ($D_f$): | 100 μm | Increasing diameter can lead to more uniform distribution if power is distributed in additional modes, Increasing size will increase size of bundle and optics. |
| Cladding thickness: | 10 μm | Increasing thickness will improve transmission for higher order modes, Increasing thickness will increase size of bundle and optics, Increasing size reduces the far-field coverage by increasing gaps between beams. |
| Fibers in bundle: | 8100 | Increasing number increases the field-of-regard. |
| Bundle size: | <1 cm² | Increasing size increases the size of the optics for coupling into and out of the bundle. |
| Fiber NA: | .27 | Increasing would further complicate design of input and output optics. |
| Input-beam parameter product: | 25 × 10 mm-mrad | Matches fiber beam parameter product in one direction and must be increased by 2.5× in the other direction to fill the fiber modes. |
| Bundle end configuration: | fused | Must determine if chalcogenide glass fibers can be fused, Coverage decreases by ~10% if fibers cannot be fused. |

In some embodiments, the present invention provides an apparatus that includes a first fiber bundle having a plurality of light-transmitting fibers including a first fiber, a second fiber, and a third fiber, the first fiber bundle having a first end and a second end, a laser that emits laser energy, a processor that generates direction-control information, a fiber selector that is operatively coupled to the processor and based on the direction-control information, is configured to direct the laser energy into the first fiber at the first end of the first fiber bundle during a first time period, and transform optics located to receive the laser energy from the second end of the first fiber bundle and configured to form an output beam of the laser energy from the first fiber in a first selected direction of a plurality of directions during the first time period.

Some embodiments further include a modulator that modulates an intensity of the laser energy according to a predetermined pattern. In some embodiments, the modulator is a controller that controls power to the source laser. In some embodiments, these provide amplitude modulation.

Some embodiments further include a sensor operatively coupled to receive electromagnetic radiation from a scene and to transmit sense information to the processor based on the received electromagnetic radiation, and wherein the processor is configured to generate the direction-control information based on the sense information.

In some embodiments of the apparatus, the sense information includes information useful for determining a first direction toward a location of a first moving object during the first time period, wherein the first selected direction of the output beam of the laser energy is the first direction toward the location of the first moving object during the first time period, wherein the sense information includes information useful for determining a second direction toward a location of the first moving object during a second time period, wherein the fiber selector, based on the direction-control information, is configured to direct the laser energy into the second fiber at the first end of the first fiber bundle during the second time period and the transform optics is configured to form an output beam of the laser energy from the second fiber in a second selected direction of the plurality of directions during the second time period, and wherein the second selected direction of the output beam of the laser energy is the second direction toward the location of the first moving object during the second time period.

In some embodiments of the apparatus, the sense information includes information useful for determining a third direction toward a location of a second moving object during a third time period, wherein the fiber selector, based on the direction-control information, is configured to direct the laser energy into the third fiber at the first end of the first fiber bundle during the third time period and the transform optics is configured to form an output beam of the laser energy from the third fiber in a third selected direction of the plurality of directions during the third time period, and wherein the third selected direction of the output beam of the laser energy is the third direction toward the location of the second moving object during the third time period.

Some embodiments further include a second fiber bundle having a plurality of light-transmitting fibers including a first fiber, a second fiber, and a third fiber, the second fiber bundle having a first end and a second end, transform optics located to receive the electromagnetic radiation from the scene and to direct electromagnetic radiation from each of a plurality of different directions into a corresponding one of the plurality of fibers in the second fiber bundle at the second end of the second fiber bundle and wherein the second end of the second fiber bundle is configured to form a pattern of electromagnetic radiation corresponding to the scene, and wherein the sensor includes a camera that obtains an image of the second end of the second bundle, in order to determine a direction to an object in the scene.

Some embodiments of the apparatus further include transform optics (e.g., a lens) located to receive the electromagnetic radiation (e.g., UV, visible, or IR light) from the scene and to direct electromagnetic radiation from each of a plurality of different directions into a corresponding one of the plurality locations on the sensor, wherein the sensor includes a camera that obtains an image of the scene, in order to determine a direction to an object in the scene.

In some embodiments, the laser is operated to output IR laser light at a wavelength greater than 2 microns and in a transmission window of the atmosphere.

In some embodiments, the sensor includes a missile-warning sensor (MWS) on an aircraft, and the apparatus is part of a countermeasures system on an aircraft intended to protect the aircraft from heat-seeking missiles.

In some embodiments, the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of the first missile during a second time period, wherein the fiber selector, based on the direction-control information, is configured to direct jamming laser energy into the second fiber at the first end of the first fiber bundle during the second time period and the transform optics is configured to form an output beam of the jamming laser energy from the second fiber in a second selected direction of the plurality of directions during the second time period, and wherein the second selected direction of the output beam of the laser energy is the second direction toward the location of the first missile during the second time period.

In some embodiments, the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of a second missile during a second time period, wherein the fiber selector, based on the direction-control information, is configured to direct jamming laser energy into the second fiber at the first end of the first fiber bundle during the second time period and the transform optics is configured to form an output beam of the jamming laser energy from the second fiber in a second selected direction of the plurality of directions during the second time period, and wherein the second selected direction of the output beam of the laser energy is the second direction toward the location of the second missile during the second time period.

Some embodiments of the method further include generating sense information useful for determining a third direction toward a location of a second moving object during a third time period, based on the direction-control information, directing the laser energy into the third fiber at the first end of the first fiber bundle during the third time period, and forming an output beam of the laser energy from the third fiber in a third selected direction of the plurality of directions during the third time period, and wherein the third selected direction of the output beam of the laser energy is the third direction toward the location of the second moving object during the third time period, in order to also track the second object.

Another aspect of the invention, in some embodiments, is a method that includes providing a first fiber bundle having a plurality of light-transmitting fibers including a first fiber, a second fiber, and a third fiber, the first fiber bundle having a first end and a second end, generating direction-control information, based on the direction-control information, directing laser energy into the first fiber at the first end of the first fiber bundle during a first time period, forming an output beam of the laser energy from the second end of the first fiber bundle, and steering the output beam of the laser energy from the first fiber in a first selected direction of a plurality of directions during the first time period.

Some embodiments of the method further include modulating an intensity of the laser energy according to a predetermined pattern.

Some embodiments of the method further include receiving electromagnetic radiation from a scene, and generating the direction-control information based on the received electromagnetic radiation.

Some embodiments of the method further include generating sense information useful for determining a first direction toward a location of a first moving object during the first time period, wherein the first selected direction of the output beam of the laser energy is the first direction toward the location of the first moving object during the first time period, wherein the sense information later includes information useful for determining a second direction toward a location of the first moving object during a second time period, based on the direction-control information, directing the laser energy into the second fiber at the first end of the first fiber bundle during the second time period and forming an output beam of the laser energy from the second fiber in a second selected direction of the plurality of directions during the second time period, and wherein the second selected direction of the output beam of the laser energy is the second direction toward the location of the first moving object during the second time period, in order to track the first object.

Some embodiments of the method further include generating sense information useful for determining a third direction toward a location of a second moving object during a third time period, based on the direction-control information, directing the laser energy into the third fiber at the first end of the first fiber bundle during the third time period, and forming an output beam of the laser energy from the third fiber in a third selected direction of the plurality of directions during the third time period, and wherein the third selected direction of the output beam of the laser energy is the third direction toward the location of the second moving object during the third time period, in order to also track the second object.

Some embodiments of the method further include providing a second fiber bundle having a plurality of light-transmitting fibers including a first fiber, a second fiber, and a third fiber, the second fiber bundle having a first end and a second end, receiving the electromagnetic radiation from the scene and directing the electromagnetic radiation from each of a plurality of different directions into a corresponding one of the plurality of fibers in the second fiber bundle at the second end of the second fiber bundle, and at the second end of the second fiber bundle, forming a pattern of electromagnetic radiation corresponding to the scene, and wherein the receiving includes obtaining an image of the second end of the second bundle, in order to determine a direction to an object in the scene.

In some embodiments, the receiving of the electromagnetic radiation from the scene includes directing electromagnetic radiation from each of a plurality of different directions into a corresponding one of the plurality locations on an imaging sensor, wherein the sensor includes a camera that obtains an image of the scene, in order to determine a direction to an object in the scene.

In other embodiments, the present invention provides an apparatus that includes a first fiber bundle having a plurality of light-transmitting fibers including a first fiber, a second fiber, and a third fiber, the first fiber bundle having a first end and a second end, means for generating direction-control information, means for directing laser energy, based on the direction-control information, into the first fiber at the first end of the first fiber bundle during a first time period, means for forming an output beam of the laser energy from the second end of the first fiber bundle, and means for steering the output beam of the laser energy from the first fiber in a first selected direction of a plurality of directions during the first time period.

Some embodiments of this apparatus further include means for modulating an intensity of the laser energy according to a predetermined pattern.

Some embodiments of this apparatus further include means for receiving electromagnetic radiation from a scene, and means for generating the direction-control information based on the received electromagnetic radiation.

Some embodiments of this apparatus further include means for generating sense information useful for determining a first direction toward a location of a first moving object during the first time period, wherein the first selected direction of the output beam of the laser energy is the first direction toward the location of the first moving object during the first time period, wherein the sense information later includes information useful for determining a second direction toward a location of the first moving object during a second time period, based on the direction-control information, directing the laser energy into the second fiber at the first end of the first fiber bundle during the second time period and forming an output beam of the laser energy from the second fiber in a second selected direction of the plurality of directions during the second time period, and wherein the second selected direction of the output beam of the laser energy is the second direction toward the location of the first moving object during the second time period, in order to track the first object.

Some embodiments of this apparatus further include means for generating sense information useful for determining a third direction toward a location of a second moving object during a third time period, means for directing the laser energy, based on the direction-control information, into the third fiber at the first end of the first fiber bundle during the third time period, and means for forming an output beam of the laser energy from the third fiber in a third selected direction of the plurality of directions during the third time period, and wherein the third selected direction of the output beam of the laser energy is the third direction toward the location of the second moving object during the third time period, in order to also track the second object.

Some embodiments of this apparatus further include a second fiber bundle having a plurality of light-transmitting fibers including a first fiber, a second fiber, and a third fiber, the second fiber bundle having a first end and a second end, means for receiving the electromagnetic radiation from the scene and directing the electromagnetic radiation from each of a plurality of different directions into a corresponding one of the plurality of fibers in the second fiber bundle at the second end of the second fiber bundle, and means for forming, at the second end of the second fiber bundle, a pattern of electromagnetic radiation corresponding to the scene, and wherein the means for receiving includes means for obtaining an image of the second end of the second bundle, in order to determine a direction to an object in the scene.

In some embodiments, the means for receiving the electromagnetic radiation from the scene includes means for directing electromagnetic radiation from each of a plurality of different directions into a corresponding one of the plurality locations on an imaging sensor, wherein the sensor includes a camera that obtains an image of the scene, in order to determine a direction to an object in the scene.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
  a first fiber bundle having a plurality of light-transmitting fibers including a first fiber, a second fiber, and a third fiber, the first fiber bundle having a first end and a second end;
  a laser that emits laser energy;
  a sensor;
  a processor operably coupled to receive information from the sensor, analyze the received information, and configured to generate direction-control information based on the analysis of the received information;
  a fiber selector that is operatively coupled to the processor and based on the direction-control information, is configured to direct the laser energy into the first fiber at the first end of the first fiber bundle during a first time period; and
  transform optics located to receive the laser energy from the second end of the first fiber bundle and configured to form an output beam of the laser energy from the first fiber bundle, wherein the transform optics is configured to perform a transform of the laser energy from a position of an end of one of the plurality of fibers in the first fiber bundle to a substantially collimated far-field beam, which is the output beam in one of a plurality of different angular directions such that the laser energy received by the transform optics from a position of the first fiber is transformed to the substantially collimated far-field output beam in a first selected angular direction of the plurality of angular directions during the first time period.

2. The apparatus of claim 1, further comprising a modulator that modulates an intensity of the laser energy according to a predetermined pattern.

3. The apparatus of claim 1, wherein the sensor is an imager that is operatively coupled to receive electromagnetic radiation from a scene and to transmit sense information to the processor based on the received electromagnetic radiation, and wherein the processor is configured to generate the direction-control information based on the sense information.

4. The apparatus of claim 3, wherein the sense information includes information useful for determining a first direction toward a location of a first moving object during the first time period, wherein the first selected direction of the output beam of the laser energy is the first direction toward the location of the first moving object during the first time period, wherein the sense information includes information useful for determining a second direction toward a location of the first moving object during a second time period, wherein the fiber selector, based on the direction-control information, is configured to direct the laser energy into the second fiber at the first end of the first fiber bundle during the second time period and the transform optics is configured to form an output beam of the laser energy from the second fiber in a second selected direction of the plurality of directions during the second time period, and wherein the second selected direction of the output beam of the laser energy is the second direction toward the location of the first moving object during the second time period.

5. The apparatus of claim 4, wherein the sense information includes information useful for determining a third direction toward a location of a second moving object during a third time period, wherein the fiber selector, based on the direction-control information, is configured to direct the laser energy into the third fiber at the first end of the first fiber bundle during the third time period and the transform optics is configured to form an output beam of the laser energy from the third fiber in a third selected direction of the plurality of directions during the third time period, and wherein the third selected direction of the output beam of the laser energy is the third direction toward the location of the second moving object during the third time period.

6. The apparatus of claim 3, further comprising:
  a second fiber bundle having a plurality of light-transmitting fibers including a first fiber, a second fiber, and a third fiber, the second fiber bundle having a first end and a second end; and
  transform optics located to receive the electromagnetic radiation from the scene and to direct electromagnetic radiation from each of a plurality of different directions into a corresponding one of the plurality of fibers in the second fiber bundle at the second end of the second fiber bundle and wherein the second end of the second fiber bundle is configured to form a pattern of electromagnetic radiation corresponding to the scene, and wherein the sensor includes a camera that obtains the received information from an image of the second end of the second bundle, in order to provide the processor with the received information from the image so that the processor can determine a direction to an object in the scene.

7. The apparatus of claim 3, further comprising:
  transform optics located to receive the electromagnetic radiation from the scene and to direct electromagnetic radiation from each of a plurality of different directions into a corresponding one of a plurality of locations on the sensor, wherein the sensor includes a camera that obtains an image of the scene, in order to determine a direction to an object in the scene.

8. The apparatus of claim 3, further comprising:
  a second fiber bundle having a plurality of light-transmitting fibers including a first fiber, a second fiber, and a third fiber, the second fiber bundle having a first end and a second end, the second fiber bundle directed toward a separate area of space than the first fiber bundle, wherein the fiber selector is operable to switch laser energy to one of a plurality of fibers of the first and second fiber bundles, and
  additional transform optics located to receive the laser energy from the second end of the second fiber bundle, where both transform optics are configured to form an output beam of the laser energy from the respective fiber bundles, each fiber bundle operable to access a different angular region of space.

9. The apparatus of claim 1, wherein the laser is operated to output IR laser light at a wavelength greater than 2 microns and in a transmission window of the atmosphere.

10. The apparatus of claim 9, wherein the sensor includes a missile-warning sensor (MWS) on an aircraft, and the apparatus is part of a countermeasures system on an aircraft intended to protect the aircraft from heat-seeking missiles.

11. The apparatus of claim 10, wherein the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of the first missile during a second time period, wherein the fiber selector, based on the direction-control information, is configured to direct jamming laser energy into the second fiber at the first end of the first fiber bundle during the second time period and the transform optics is configured to form an output beam of the jamming laser energy from the second fiber in a second selected direction of the plurality of directions during the second time period, and wherein the second selected direction of the output beam of the laser energy is the second direction toward the location of the first missile during the second time period.

12. The apparatus of claim 10, wherein the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of a second missile during a second time period, wherein the fiber selector, based on the direction-control information, is configured to direct jamming laser energy into the second fiber at the first end of the first fiber bundle during the second time period and the transform optics is configured to form an output beam of the jamming laser energy from the second fiber in a second selected direction of the plurality of directions during the second time period, and wherein the second selected direction of the output beam of the laser energy is the second direction toward the location of the second missile during the second time period.

13. The apparatus of claim 1, wherein the sensor is an imager configured to provide image information for use by the processor.

14. The apparatus of claim 1, wherein the plurality of fibers of the first fiber bundle are fused together at the second end of the first fiber bundle such that interstitial spaces between the plurality of fibers are substantially eliminated.

15. The apparatus of claim 1, wherein the plurality of fibers of the first fiber bundle are formed to abutting hexagonal cross-sectional shapes at the second end of the first fiber bundle.

16. The apparatus of claim 1, wherein the transform optics is located at a distance of substantially one focal length from the second end of the first fiber bundle.

17. A method comprising:
providing a first fiber bundle having a plurality of light-transmitting fibers including a first fiber, a second fiber, and a third fiber, the first fiber bundle having a first end and a second end;
obtaining sensor information;
analyzing the obtained sensor information;
based on the analyzed sensor information, generating direction-control information;
based on the direction-control information, directing laser energy into the first fiber at the first end of the first fiber bundle during a first time period;
forming an output beam of the laser energy from the second end of the first fiber bundle, wherein the forming of the output beam includes performing a transform of the laser energy from a position of an end of one of the plurality of fibers in the first fiber bundle to a substantially collimated far-field beam, which is the output beam, in one of a plurality of different angular directions; and
steering the output beam of the laser energy from the first fiber in a first selected angular direction of the plurality of angular directions during the first time period.

18. The method of claim 17, further comprising modulating an intensity of the laser energy according to a predetermined pattern.

19. The method of claim 17, further comprising:
receiving electromagnetic radiation from a scene; and
generating the direction-control information based on the received electromagnetic radiation.

20. The method of claim 19, further comprising
generating sense information useful for determining a first direction toward a location of a first moving object during the first time period, wherein the first selected direction of the output beam of the laser energy is the first direction toward the location of the first moving object during the first time period, wherein the sense information later includes information useful for determining a second direction toward a location of the first moving object during a second time period, based on the direction-control information, directing the laser energy into the second fiber at the first end of the first fiber bundle during the second time period and forming an output beam of the laser energy from the second fiber in a second selected direction of the plurality of directions during the second time period, and wherein the second selected direction of the output beam of the laser energy is the second direction toward the location of the first moving object during the second time period, in order to track the first object.

21. The method of claim 20, further comprising
generating sense information useful for determining a third direction toward a location of a second moving object during a third time period;
based on the direction-control information, directing the laser energy into the third fiber at the first end of the first fiber bundle during the third time period; and
forming an output beam of the laser energy from the third fiber in a third selected direction of the plurality of directions during the third time period, and wherein the third selected direction of the output beam of the laser energy is the third direction toward the location of the second moving object during the third time period, in order to also track the second object.

22. The method of claim 19, further comprising:
providing a second fiber bundle having a plurality of light-transmitting fibers including a first fiber, a second fiber, and a third fiber, the second fiber bundle having a first end and a second end;
receiving the electromagnetic radiation from the scene and directing the electromagnetic radiation from each of a plurality of different directions into a corresponding one of the plurality of fibers in the second fiber bundle at the second end of the second fiber bundle; and
at the second end of the second fiber bundle, forming a pattern of electromagnetic radiation corresponding to the scene, and wherein the receiving includes obtaining an image of the second end of the second bundle, in order to determine a direction to an object in the scene.

23. The method of claim 19, wherein the receiving of the electromagnetic radiation from the scene includes directing electromagnetic radiation from each of a plurality of different directions into a corresponding one of a plurality of locations on an imaging sensor, wherein the sensor includes a camera that obtains an image of the scene, in order to determine a direction to an object in the scene.

24. The method of claim 19, further comprising:
a second fiber bundle having a plurality of light-transmitting fibers including a first fiber, a second fiber, and a third fiber, the second fiber bundle having a first end and a second end, the second fiber bundle directed toward a separate area of space than the first fiber bundle, wherein the fiber selector is operable to switch laser energy to one of a plurality of fibers of the first and second fiber bundles, and
additional transform optics located to receive the laser energy from the second end of the second fiber bundle, where both transform optics are configured to form an output beam of the laser energy from the respective fiber bundles, each fiber bundle operable to access a different angular region of space.

25. The method of claim 17, wherein the laser is operated to output IR laser light at a wavelength greater than 2 microns and in a transmission window of the atmosphere.

26. The method of claim 25, wherein the sensor includes a missile-warning sensor (MWS) on an aircraft, and the apparatus is part of a countermeasures system on an aircraft intended to protect the aircraft from heat-seeking missiles.

27. The method of claim 26, wherein the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of the first missile during a second time period, wherein the method, based on the direction-control information, include directing jamming laser energy into the second fiber at the first end of the first fiber bundle during the second time period and forming an output beam of the jamming laser energy from the second fiber in a second selected direction of the plurality of directions during the second time period, and wherein the second selected direction of the output beam of the laser energy is the second direction toward the location of the first missile during the second time period.

28. The method of claim 26, wherein the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of a second missile during a second time period, wherein the method, based on the direction-control information, include directing jamming laser energy into the second fiber at the first end of the first fiber bundle during the second time period and forming an output beam of the jamming laser energy from the second fiber in a second selected direction of the plurality of directions during the second time period, and wherein the second selected direction of the output beam of the laser energy is the second direction toward the location of the second missile during the second time period.

29. The method of claim 17, wherein the obtaining of sensor information includes obtaining image information.

30. The method of claim 17, further comprising fusing together the plurality of fibers of the first fiber bundle at the second end of the first fiber bundle such that interstitial spaces between the plurality of fibers are substantially eliminated.

31. The method of claim 17, further comprising forming the plurality of fibers of the first fiber bundle to abutting hexagonal cross-sectional shapes at the second end of the first fiber bundle.

32. The method of claim 17, wherein the performing of the transform of the laser energy includes performing the transform at a distance of substantially one focal length from the second end of the first fiber bundle.

33. An apparatus comprising:
a first fiber bundle having a plurality of light-transmitting fibers including a first fiber, a second fiber, and a third fiber, the first fiber bundle having a first end and a second end;
means for obtaining sensor information;
means for analyzing the obtained sensor information;
means for generating direction-control information based on the analyzed sensor information;
means for directing laser energy, based on the direction-control information, into the first fiber at the first end of the first fiber bundle during a first time period;
means for forming an output beam of the laser energy from the second end of the first fiber bundle, wherein the means for forming the output beam includes means for performing a transform of the laser energy from a position of an end of one of the plurality of fibers in the first fiber bundle to a substantially collimated far-field beam, which is the output beam, in one of a plurality of different angular directions; and
means for steering the output beam of the laser energy from the first fiber in a first selected angular direction of the plurality of angular directions during the first time period.

34. The apparatus of claim 33, further comprising means for modulating an intensity of the laser energy according to a predetermined pattern.

35. The apparatus of claim 33, further comprising:
means for receiving electromagnetic radiation from a scene; and
means for generating the direction-control information based on the received electromagnetic radiation.

36. The apparatus of claim 35, further comprising
means for generating sense information useful for determining a first direction toward a location of a first moving object during the first time period, wherein the first selected direction of the output beam of the laser energy is the first direction toward the location of the first moving object during the first time period, wherein the sense information later includes information useful for determining a second direction toward a location of the first moving object during a second time period, based on the direction-control information, directing the laser energy into the second fiber at the first end of the first fiber bundle during the second time period and forming an output beam of the laser energy from the second fiber in a second selected direction of the plurality of directions during the second time period, and wherein the second selected direction of the output beam of the laser energy is the second direction toward the location of the first moving object during the second time period, in order to track the first object.

37. The apparatus of claim 36, further comprising
means for generating sense information useful for determining a third direction toward a location of a second moving object during a third time period;

means for directing the laser energy, based on the direction-control information, into the third fiber at the first end of the first fiber bundle during the third time period; and means for forming an output beam of the laser energy from the third fiber in a third selected direction of the plurality of directions during the third time period, and wherein the third selected direction of the output beam of the laser energy is the third direction toward the location of the second moving object during the third time period, in order to also track the second object.

38. The apparatus of claim 35, further comprising:

a second fiber bundle having a plurality of light-transmitting fibers including a first fiber, a second fiber, and a third fiber, the second fiber bundle having a first end and a second end;

means for receiving the electromagnetic radiation from the scene and directing the electromagnetic radiation from each of a plurality of different directions into a corresponding one of the plurality of fibers in the second fiber bundle at the second end of the second fiber bundle; and means for forming, at the second end of the second fiber bundle, a pattern of electromagnetic radiation corresponding to the scene, and wherein the means for receiving includes means for obtaining an image of the second end of the second bundle, in order to determine a direction to an object in the scene.

39. The apparatus of claim 35, wherein the means for receiving the electromagnetic radiation from the scene includes means for directing electromagnetic radiation from each of a plurality of different directions into a corresponding one of a plurality of locations on an imaging sensor, wherein the sensor includes a camera that obtains an image of the scene, in order to determine a direction to an object in the scene.

40. The apparatus of claim 35, wherein the laser is operated to output IR laser light at a wavelength greater than 2 microns and in a transmission window of the atmosphere.

41. The apparatus of claim 40, wherein the sensor includes a missile-warning sensor (MWS) on an aircraft, and the apparatus is part of a countermeasures system on an aircraft intended to protect the aircraft from heat-seeking missiles.

42. The apparatus of claim 41, wherein the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of the first missile during a second time period, wherein the method, based on the direction-control information, include directing jamming laser energy into the second fiber at the first end of the first fiber bundle during the second time period and forming an output beam of the jamming laser energy from the second fiber in a second selected direction of the plurality of directions during the second time period, and wherein the second selected direction of the output beam of the laser energy is the second direction toward the location of the first missile during the second time period.

43. The apparatus of claim 42, wherein the information detected by the MWS includes information useful for determining a first direction from the aircraft toward a location of a first missile during the first time period, wherein the first selected direction of the output beam of the laser energy is the first direction toward the location of the first missile during the first time period, wherein the sense information includes information useful for determining a second direction from the aircraft toward a location of a second missile during a second time period, wherein the method, based on the direction-control information, include directing jamming laser energy into the second fiber at the first end of the first fiber bundle during the second time period and forming an output beam of the jamming laser energy from the second fiber in a second selected direction of the plurality of directions during the second time period, and wherein the second selected direction of the output beam of the laser energy is the second direction toward the location of the second missile during the second time period.

44. The apparatus of claim 35, further comprising:

a second fiber bundle having a plurality of light-transmitting fibers including a first fiber, a second fiber, and a third fiber, the second fiber bundle having a first end and a second end, the second fiber bundle directed toward a separate area of space than the first fiber bundle, wherein the fiber selector is operable to switch laser energy to one of a plurality of fibers of the first and second fiber bundles, and additional transform optics located to receive the laser energy from the second end of the second fiber bundle, where both transform optics are configured to form an output beam of the laser energy from the respective fiber bundles, each fiber bundle operable to access a different angular region of space.

45. The apparatus of claim 33, wherein the means for obtaining of sensor information includes means for obtaining image information.

46. The apparatus of claim 33, further comprising means for fusing together the plurality of fibers of the first fiber bundle at the second end of the first fiber bundle such that interstitial spaces between the plurality of fibers are substantially eliminated.

47. The apparatus of claim 33, further comprising means for forming the plurality of fibers of the first fiber bundle to abutting hexagonal cross-sectional shapes at the second end of the first fiber bundle.

48. The apparatus of claim 33, wherein the means for performing the transform of the laser energy is located at a distance of substantially one focal length from the second end of the first fiber bundle.

* * * * *